United States Patent
Kato et al.

(10) Patent No.: US 8,387,583 B2
(45) Date of Patent: Mar. 5, 2013

(54) ENGINE BALANCER

(75) Inventors: Chiaki Kato, Kure (JP); Kazuya Ito, Higashi-Hiroshima (JP); Naohiro Koi, Kure (JP); Sakumi Haseto, Hiroshima (JP); Eiji Wada, Higashi-Hiroshima (JP); Masaaki Sato, Higashi-Hiroshima (JP)

(73) Assignee: Mazda Motor Corporation (JP)

( * ) Notice: Subject to any disclaimer, the term of this patent is extended or adjusted under 35 U.S.C. 154(b) by 473 days.

(21) Appl. No.: 12/637,911

(22) Filed: Dec. 15, 2009

(65) Prior Publication Data

US 2010/0154735 A1 Jun. 24, 2010

(30) Foreign Application Priority Data

Dec. 22, 2008 (JP) ................................ 2008-326240

(51) Int. Cl.
*F02B 75/06* (2006.01)

(52) U.S. Cl. ............... 123/192.2; 123/195 C; 123/198 E

(58) Field of Classification Search ............... 123/192.1, 123/192.2; 74/603, 604; 464/180; 384/50
See application file for complete search history.

(56) References Cited

U.S. PATENT DOCUMENTS

| 4,480,607 | A | * | 11/1984 | Tsai et al. | 123/192.2 |
| 4,677,948 | A | * | 7/1987 | Candea | 123/192.2 |
| 5,743,230 | A | | 4/1998 | Yamazaki et al. | |
| 6,263,853 | B1 | * | 7/2001 | Rau | 123/192.2 |
| 6,268,474 | B1 | * | 7/2001 | Smith et al. | 530/326 |
| 7,270,104 | B2 | * | 9/2007 | Hashimoto et al. | 123/192.2 |
| 2003/0075136 | A1 | * | 4/2003 | Inaba et al. | 123/192.2 |
| 2005/0061284 | A1 | | 3/2005 | Sato et al. | |
| 2006/0130797 | A1 | * | 6/2006 | Klotz et al. | 123/192.2 |
| 2007/0177837 | A1 | | 8/2007 | Tisch et al. | |

FOREIGN PATENT DOCUMENTS

| JP | S58-140346 U | 9/1983 |
| JP | H7-167218 A | 7/1995 |
| JP | H9-210136 A | 8/1997 |
| JP | 2005-090691 A | 4/2005 |

* cited by examiner

*Primary Examiner* — Noah Kamen
*Assistant Examiner* — Hung Q Nguyen
(74) *Attorney, Agent, or Firm* — Studebaker & Brackett PC; Donald R. Studebaker

(57) ABSTRACT

An engine balancer includes a pair of balancer shafts and a balancer housing for housing the balancer shafts, and is placed in an oil pan at the bottom of an engine. The balancer housing includes a pair of front and rear bearing walls respectively supporting the balancer shafts with rolling bearings interposed therebetween. The bearing walls of the balancer housing are attached to bearing walls for a crankshaft. The housing body has an aperture at the top thereof. The aperture of the housing body is covered with a plate-shaped cover member thinner than a member forming the housing body.

20 Claims, 16 Drawing Sheets

RIGHT ←——————→ LEFT
LATERAL DIRECTION
OF ENGINE

RIGHT ←——→ LEFT
LATERAL DIRECTION
OF ENGINE

LEFT ←——→ RIGHT
LATERAL DIRECTION
OF ENGINE

RIGHT ←——→ LEFT
LATERAL DIRECTION
OF ENGINE

LEFT ←——→ RIGHT
LATERAL DIRECTION
OF ENGINE

RIGHT ← → LEFT
LATERAL DIRECTION
OF ENGINE

RIGHT ← → LEFT
LATERAL DIRECTION
OF ENGINE

RIGHT ←——————→ LEFT
LATERAL DIRECTION
OF ENGINE

RIGHT ←——————→ LEFT
LATERAL DIRECTION
OF ENGINE

ENGINE BALANCER

CROSS-REFERENCE TO RELATED APPLICATION

This application claims priority to Japanese Patent Application No. 2008-326240 filed on Dec. 22, 2008, the disclosure of which including the specification, the drawings, and the claims is hereby incorporated by reference in its entirety.

BACKGROUND

The present disclosure relates to engine balancers provided in oil pans at the bottoms of engines and configured to reduce vibration and noise of the engines.

In many of conventional balancers of this type, a pair of balancer shafts having weight parts is supported by a housing with metal bearings interposed therebetween, and one of the balancer shafts receives power from a crankshaft to rotate in synchronization with the other balancer shaft through engaging gears engaged with each other, thereby canceling vibration due to rotational imbalance of the crankshaft caused by eccentric rotation of the weight parts.

In such a balancer, the balancer shafts always rotate at high speed together with the crankshaft, and thus the metal bearings for supporting the balancer shafts are lubricated with lubricating oil supplied from the outside.

For example, Japanese Patent Publication No. 2005-90691 describes a balancer in which a housing is divided into upper and lower cases having half-circle shaped recess portions, and a hole formed by attaching these recess portions together forms a metal bearing. In this balancer, in order to avoid the necessity for providing an additional oil passage for lubricating oil, a recess groove is formed at a facing surface between the upper and lower cases, and these upper and lower cases are brought into contact with each other to form a lubricating oil passage for supplying lubricating oil to the metal bearing.

Since the balancer shafts are rotated by receiving power from the crankshaft, it is conceivable to use bearings for the balancer shafts as rolling bearings in order to reduce friction between the balancer shafts and the bearings and, thereby, to reduce fuel consumption. U.S. Patent Application No. 2007/177837 A1 schematically shows, with reference to FIGS. 5 and 6, that a pair of unbalanced weight shafts is supported with rolling bearings in the form of needle rolling bearings in a housing located below a crankshaft of a four-cylinder engine.

In this application (2007/177837 A1), as compared to Japanese Patent Publication No. 2005-90691, rolling bearings are used instead of sliding bearings, and thus friction on the bearings is considerably reduced, thereby reducing fuel consumption.

SUMMARY

However, supporting balancer shafts with rolling bearings involves the following problem. Although the rolling bearings require lubricating oil, an excessively large amount of supplied lubricating oil can adversely inhibit rotation of balls, rollers, and other elements of the rolling bearings. In view of this, it is necessary to avoid an excess supply of lubricating oil to the rolling bearings. However, a conventional balancer is generally immersed in oil stored in an oil pan at the bottom of an engine, and thus oil accumulates in a housing, thereby causing rolling bearings to be immersed in oil.

To solve this problem, it is conceivable to achieve a more compact housing by reducing the thickness of the upper wall of the housing. This configuration is intended to locate a balancer at a position as high as possible, while preventing the housing from being in contact with a connecting rod.

However, since the housing is often formed by casting, the minimum thickness of the housing needs to be kept. For this reason, it is difficult to drastically reduce the thickness of the upper wall of the housing.

It is therefore an object of the present invention to provide a technique for ensuring smooth rotation of rolling bearings for balancers of an engine by reducing an excess supply of lubricating oil to the rolling bearings.

To achieve the object, according to the present invention, the top of a housing body of a balancer housing located close to a crankshaft or a connecting rod has an aperture, and this aperture is covered with a cover member thinner than the housing body so that a drop of lubricating oil into the balancer housing is reduced and that the height of the balancer housing is reduced to locate the shaft axes of the balancer shafts at a higher level, thereby reducing immersion of rolling bearings in oil.

In a first aspect of the present invention, an engine balancer provided in an oil pan located at a bottom of an engine includes: a pair of balancer shafts extending in a fore and aft direction of the engine and disposed side by side in a lateral direction of the engine, the fore and aft direction of the engine being parallel to a crankshaft, the lateral direction of the engine being orthogonal to the fore and aft direction and to a vertical direction of the engine; and a balancer housing for housing the pair of balancer shafts. The balancer housing includes a pair of front and rear bearing walls disposed in the fore and aft direction of the engine, and having a pair of left and right bearing holes respectively penetrating the pair of front and rear bearing walls and supporting the pair of balancer shafts with rolling bearings interposed therebetween, and a housing body located between the pair of front and rear bearing walls. The bearing walls of the balancer housing are attached to bearing walls for supporting the crankshaft provided in the engine. The housing body has an aperture at a top thereof. The aperture is covered with a plate-shaped cover member thinner than a member forming the housing body.

In the first aspect, the pair of balancer shafts is supported by a pair of front and rear bearing holes with rolling bearings interposed therebetween. Accordingly, as compared to the case of employing metal bearings, friction between the balancer shafts and the bearings can be reduced, thereby reducing fuel consumption.

In addition, since the bearing walls of the balancer housing are attached to the bearing walls for supporting the crankshaft provided in the engine, the crankshaft rotates above the housing body located between these bearing walls. The housing body has an aperture at the top thereof, and the aperture is covered with the cover member thinner than a member forming the housing body. Accordingly, as compared to a structure in which the balancer housing has a thick upper wall, the height of the balancer housing can be reduced such that the shaft axes of the balancer shafts can be located at a higher level. As a result, the rolling bearings are less likely to be immersed in oil.

Further, since the aperture of the housing body is covered with the cover member, it is possible to reduce an unintentional supply of lubricating oil which has dropped from, for example, the crankshaft to the rolling bearings.

With the foregoing configuration, it is possible to reduce an excess supply of lubricating oil to the rolling bearings, thereby ensuring smooth rotation of the rolling bearings.

In accordance with a second aspect of the present invention, in the first aspect, the pair of balancer shafts includes balancer weight parts provided between the pair of front and rear bearing walls and engaging gears engaged with each other, and is inserted through an opening formed at a first side, in the fore and aft direction of the engine, of the balancer housing to be placed in the balancer housing, and an outer diameter of rotational path of each of the balancer weight parts is smaller than an inner diameter of an outer race of the rolling bearing of one of the pair of front and rear bearing walls located at the first side in the fore and aft direction of the engine, and is larger than an outer diameter of an inner race of the rolling bearing of the other bearing wall.

In the second aspect, the outer diameter of rotational path of the balancer weight parts is smaller than the inner diameter of outer race of the rolling bearing of one of the pair of front and rear bearing walls provided at the first side in the fore and aft direction of the engine, and is larger than the outer diameter of the inner race of the rolling bearing of the bearing wall at the second side in the fore and aft direction of the engine. Accordingly, when the inner diameter of the bearing hole (including the outer race) is large enough to allow the balancer weight parts to pass therethrough, the balancer shafts can be smoothly inserted through the end of the balancer housing at the first side in the fore and aft direction of the engine even in a case where the balancer shafts are inserted in the balancer housing with, for example, the inner race press fitted with the balancer shafts and the outer race press fitted with the balancer housing. As a result, reducing the outer diameter of rotational path of the balancer weight parts can achieve compact size of the balancer housing accordingly.

In a configuration in which a lubricating oil passageway is formed at a facing surface as in the balancer described in Japanese Patent Publication No. 2005-90691 mentioned above, a joint between a pair of balancer shafts needs to be tightened with bolts in order to prevent both cases from opening under hydraulic pressure. To tighten the joint between the pair of balancer shafts with bolts, the distance between the pair of balancer shafts needs to be kept large. When the distance between the pair of balancer shafts is large, engaging gears for the balancer shafts become large, thereby making it difficult to achieve a compact housing for housing the balancer shafts.

In contrast, in the balancer, the balancer shafts are inserted through the end of the balancer housing at a first side, in the fore and aft direction of the engine, of the balancer housing. Accordingly, unlike conventional balancers, the balancer housing of this disclosure does not need to be split vertically. Therefore, it is unnecessary to increase the distance between the pair of balancer shafts, and the engaging gears provided for the balancer shafts can be made small, thereby achieving compact size of the balancer housing for housing the balancer shafts. As a result, immersion of the rolling bearings in oil can be further reduced.

In accordance with a third aspect of the present invention, in the second aspect, the cover member extends along an outer periphery of rotational path of each of the balancer weight parts in cross section.

In the third aspect, the cover member has a recess at, for example, an intermediate portion thereof in the lateral direction such that the cover member partially enters the housing. In this manner, the shaft axes of the balancer shafts in the balancer housing can be located at a higher level.

In accordance with a fourth aspect of the present invention, in the second or third aspect, the engaging gears are closer to the first side in the fore and aft direction of the engine, than one of the pair of front and rear bearing walls located at the first side in the fore and aft direction of the engine.

In the fourth aspect, the engaging gears having an outer diameter larger than that of the balancer weight parts are located at the side opposite the side through which the balancer shafts are inserted. Accordingly, these engaging gears do not need to be inserted into the bearing holes formed through the pair of front and rear bearing walls. As a result, the bearing holes do not need to be larger, thereby achieving more compact size of the balancer housing.

In accordance with a fifth aspect of the present invention, in one of the first through fourth aspects, the cover member extends laterally outwardly beyond both ends, in the lateral direction of the engine, of the aperture, and is adjacent to the housing body with a gap interposed therebetween in the vertical direction of the engine.

In general, lubricating oil used for lubricating the rolling bearings is accumulated in the housing body, and the accumulated lubricating oil is swept by the balancer weight parts which provide synchronous rotation.

In the fifth aspect, the cover member is adjacent to the housing body with a gap interposed therebetween in the vertical direction of the engine. In this structure, lubricating oil swept by the balancer weight parts passes through the gap. In addition, the cover member extends laterally outwardly beyond both ends, in the lateral direction of the engine, of the aperture. Accordingly, the lubricating oil that has passed through the gap is easily guided by the cover member to be drained to outside the housing body.

In accordance with a sixth aspect of the present invention, in one of the first through fifth aspects, mounting eyes project from tops of the pair of bearing walls of the balancer housing, the pair of bearing walls of the balancer housing is attached to the bearing walls for supporting the crankshaft with the mounting eyes interposed therebetween, and the cover member is located below tops of the mounting eyes in the vertical direction of the engine.

In the sixth aspect, the cover member is located below the tops of the mounting eyes in the vertical direction of the engine. Accordingly, even when the mounting eyes have a small projection length, it is possible to easily ensure a sufficient distance between the cover member and a connecting rod.

In accordance with a seventh aspect of the present invention, in one of the first through sixth aspects, the pair of bearing walls of the balancer housing is attached to the bearing walls for the supporting crankshaft sandwiching two adjacent cylinders in the fore and aft direction of the engine.

In the seventh aspect, the aperture of the housing body is formed across two cylinders of the engine, and thus the length of the balancer weight parts in the fore and aft direction of the engine can be increased. Accordingly, vibration due to rotational imbalance of the crankshaft can be canceled, without the necessity for increasing the length of the balancer weight parts in the radial direction of the shaft. As a result, reduction in the width and height of the balancer housing can be further ensured.

According to the present disclosure, the housing body has an aperture at the top thereof, and the aperture is covered with the cover member thinner than a member forming the housing body. With this structure, the shaft axes of the balancer shafts in the balancer housing attached to the engine are located at a higher level, an excess supply of lubricating oil to the rolling bearings can be reduced, thereby ensuring smooth rotation of the rolling bearings.

DETAILED DESCRIPTION

An example embodiment will be described hereinafter with reference to the drawings.

Figure 1:
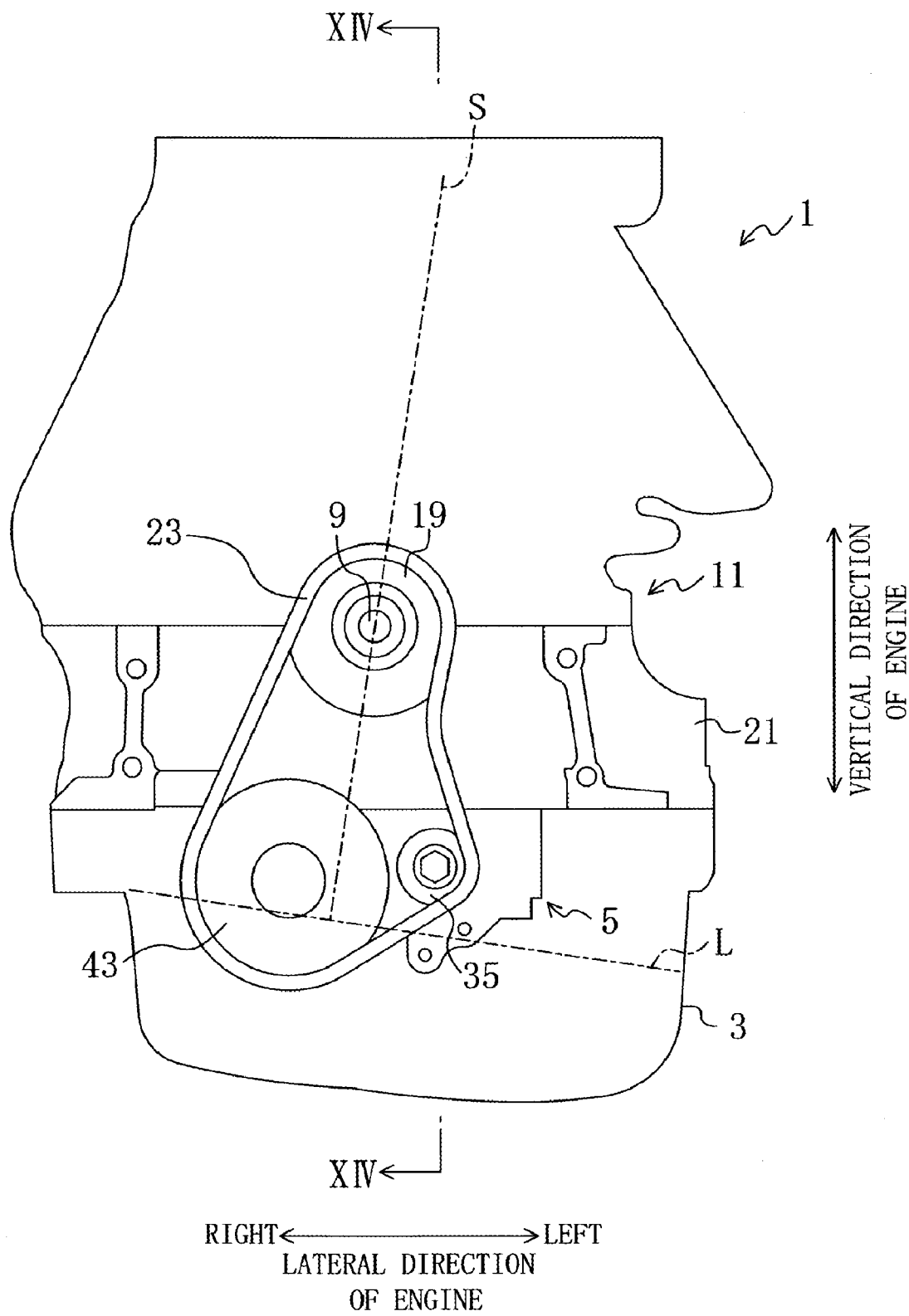
FIG. 1 is a view schematically illustrating a main portion of an engine including a balancer according to an example embodiment when viewed from the front side of the engine.
Figure 2:
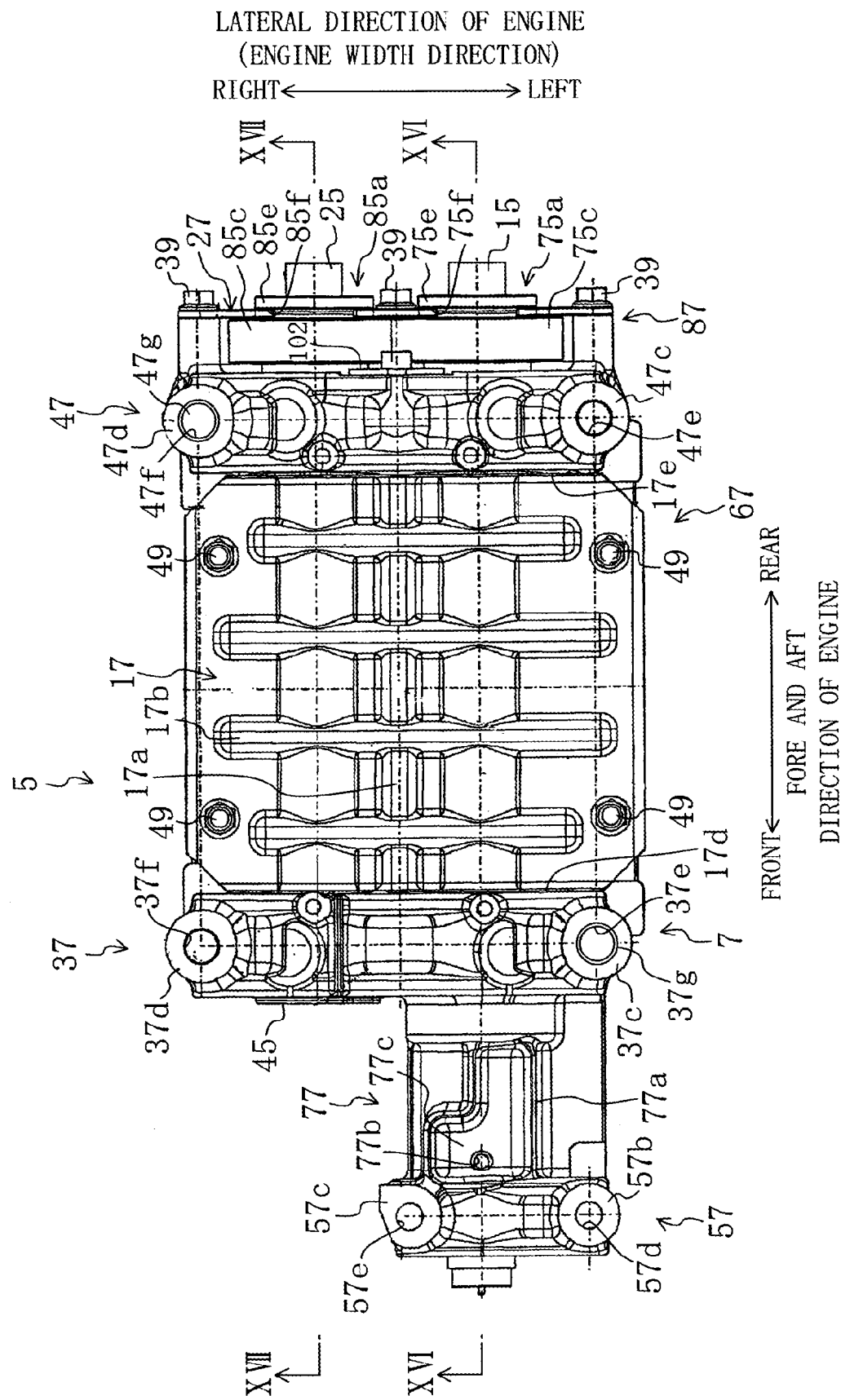
FIG. 2 is a plan view of the balancer.

FIG. 1 is a view schematically illustrating a main portion of an inline four-cylinder engine including a balancer 5 according to an example embodiment when viewed from the front side of a body 1 of the engine. In this engine body 1, an oil pan 3 is coupled to the bottom surface of a cylinder block 11 through a lower block 21. This oil pan 3 houses the balancer 5 coupled to the bottom surface of the lower block 21 and an oil pump (not shown).

The engine body 1 is mounted on a vehicle, while being inclined about 10° with respect to a vertical line S shown in FIG. 1. Accordingly, oil stored in the oil pan 3 occupies approximately the lower half of the oil pan 3 with the level surface L thereof inclined about 10° with respect to the joint surface between the oil pan 3 and the lower block 21.

A transmission mechanism which transmits crank effort of a crankshaft 9 to the balancer 5 and the oil pump to drive the balancer 5 and the oil pump, is placed at the front of the engine body 1. This transmission mechanism includes: a driving sprocket 19 attached to the tip of the crankshaft 9; a driven sprocket 35 attached to the tip of a driving balancer shaft 15 which will be described later; a driven sprocket 43 provided in the oil pump; a transmission chain 23 wound around these sprockets; a tensioner (not shown) which adjusts tension of the transmission chain 23 wound around the sprockets 19, 35, and 43.

FIGS. 2-5 respectively illustrate a plan view, a side view, a front view, and a rear view of the balancer 5. As illustrated in these drawings, the balancer 5 is formed as a unit, and includes: driving and driven balancer shafts (i.e., a pair of balancer shafts) 15 and 25 extending in the fore and aft direction (which is parallel to the crankshaft) of the engine and disposed side by side in the lateral (i.e., the width) direction (which is orthogonal to the vertical direction and to the fore and aft direction of the engine); a balancer housing 7 which houses the balancer shafts 15 and 25; a housing cover 17 which covers the top of the balancer housing 7; and a thrust plate 27 which covers the rear end of the balancer housing 7. In the following description, the fore and aft direction of the engine will be simply referred to as the "fore and aft direction," the front side in the fore and aft direction of the engine (e.g., a second end in the fore and aft direction of the engine) will be simply referred to as the "front side," the rear end in the fore and aft direction of the engine (e.g., a first side in the fore and aft direction of the engine) will be simply referred to as the "rear side," the lateral direction of the engine will be simply referred to as the "lateral direction," the left in the lateral direction of the engine will be simply referred to as the "left," the right in the lateral direction of the engine will be simply referred to as the "right," and the vertical direction of the engine will be simply referred to as the "vertical direction."

—Balancer Housing—

Figure 6:
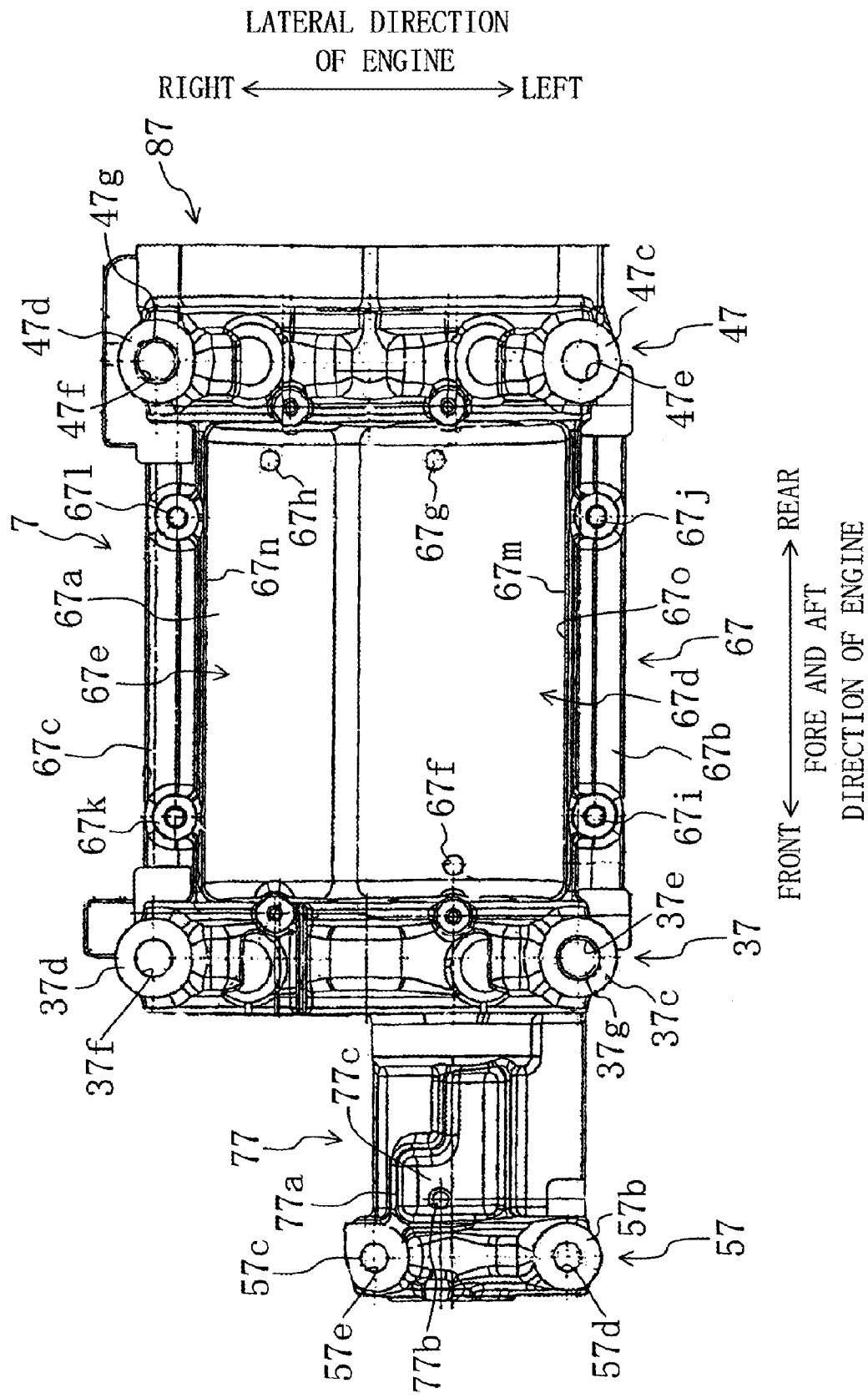
FIG. 6 is a plan view of a balancer housing.

The balancer housing 7 has no split surfaces, and is an aluminum die cast housing which is casted as one piece. As illustrated in FIG. 6, the balancer housing 7 includes: a front bearing wall 37 supporting an intermediate portion (i.e., the rear end of a shaft extension 15f, which will be described later) in the axial direction of the driving balancer shaft 15 and the front end of a driven balancer shaft 25; a rear bearing wall 47 supporting the rear ends of the respective balancer shafts 15 and 25; a distal bearing wall 57 supporting the front end (i.e., the front end of the shaft extension 15f of the driving balancer shaft 15; a housing body 67 located between the front bearing wall 37 and the rear bearing wall 47; a housing extension 77 located between the distal bearing wall 57 and the front bearing wall 37; and a gear housing 87 for housing engaging gears 75a and 85a which will be described later.

Figure 7:
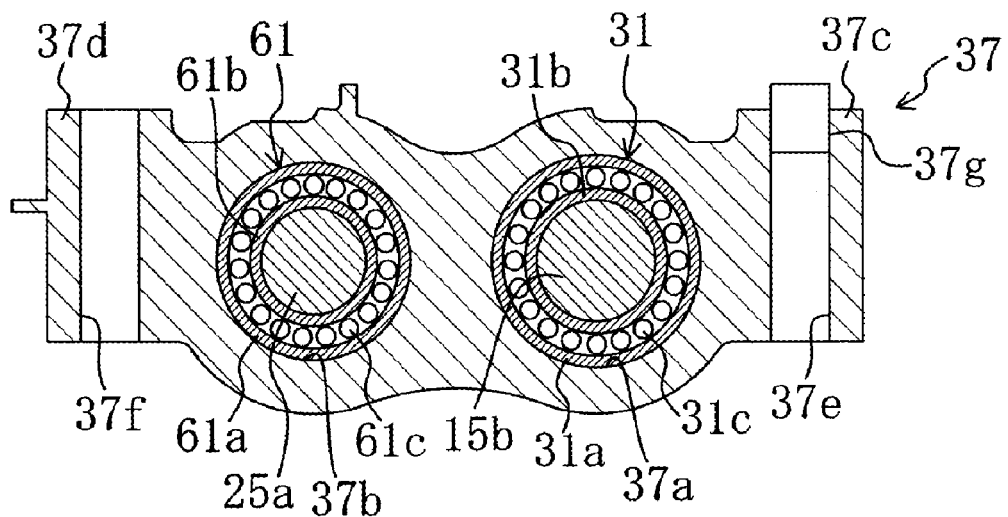
FIG. 7 is a cross-sectional view taken along line VII-VII in FIG. 3.

As illustrated in FIG. 7, a left bearing hole 37a extending in the fore and aft direction and rotatably supporting an intermediate portion (i.e., the rear end of the shaft extension 15f) in the axial direction of the driving balancer shaft 15 and a right bearing hole 37b extending in the fore and aft direction and rotatably supporting the front end of the driven balancer shaft 25 are disposed side by side in the lateral direction, and penetrate the front bearing wall 37. The inner diameter of the left bearing hole 37a for supporting the driving balancer shaft 15 is larger than the inner diameter of the right bearing hole 37b for supporting the driven balancer shaft 25. Needle rolling bearings 31 and 61 (i.e., rolling bearings), which will be described later, are respectively inserted into the bearing holes 37a and 37b.

Approximately cylindrical mounting eyes 37c and 37d are respectively formed at both ends, in the lateral direction, of the front bearing wall 37, and project upward from the top of the front bearing wall 37. Mounting holes 37e and 37f which vertically penetrate end portions of the front bearing wall 37 and through which bolts (not shown) for fixing the balancer housing 7 to the bottom surface of the lower block 21 are inserted, are formed at the centers of the mounting eyes 37c and 37d. Approximately the lower half of a cylindrical pin 37g is inserted in the left mounting hole 37e. This pin 37g is used as a positioning pin to be inserted in a bolt insertion hole 21k formed in the bottom surface of the lower block 21, in attaching the balancer housing 7 to the lower block 21. The pin 37g is formed to allow a bolt to penetrate therethrough.

Figure 4:
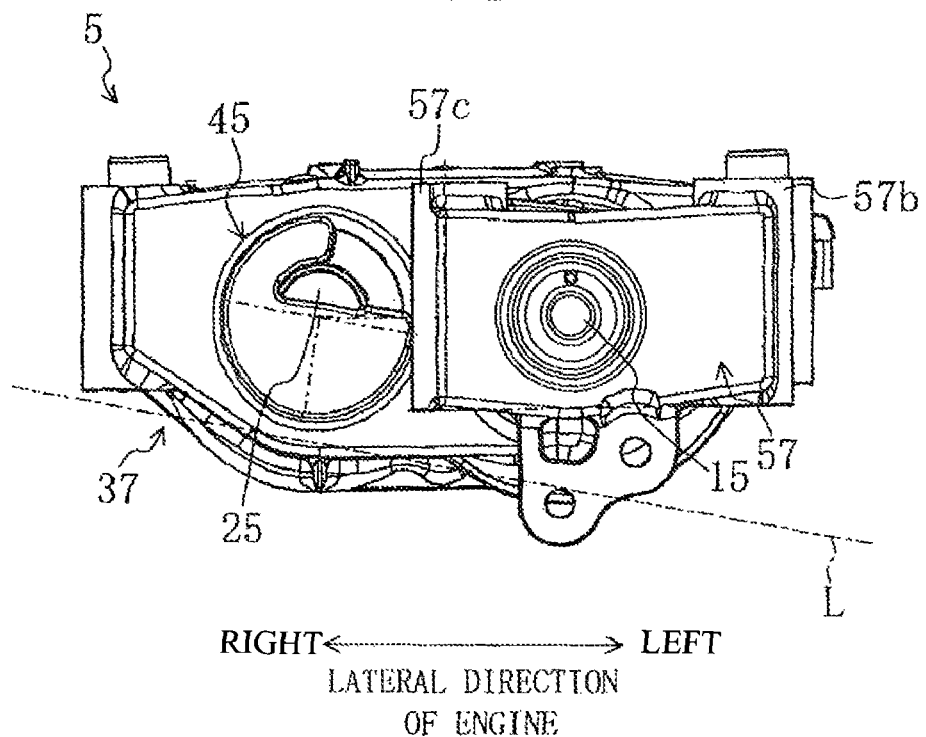
FIG. 4 is a front view of the balancer.

As illustrated in FIG. 4, at the right of the front end surface of the front bearing wall 37, a cap 45 is fitted onto the front edge of the right bearing hole 37b in order to isolate the hole 37b from oil stored outside the balancer housing 7 in principle. This cap 45 serves as part of a third lubricating-oil passageway 97, which will be described later.

Figure 8:
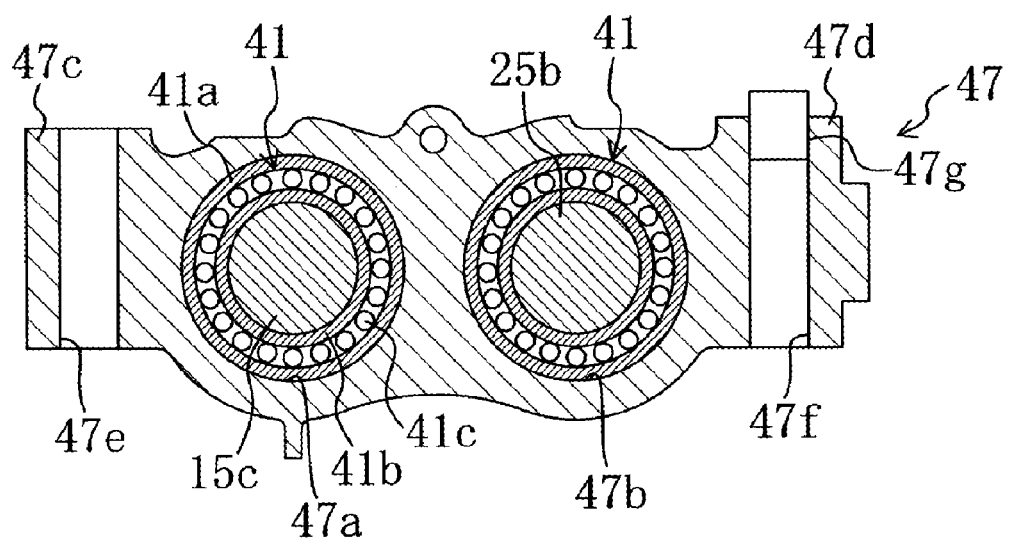
FIG. 8 is a cross-sectional view taken along line VIII-VIII in FIG. 3.

As illustrated in FIG. 8, two bearing holes 47a and 47b extending in the fore and aft direction and rotatably supporting the rear ends of the balancer shafts 15 and 25 are disposed side by side in the lateral direction, and penetrate the rear bearing wall 47. The inner diameter of the left bearing hole 47a for supporting the driving balancer shaft 15 is equal to the inner diameter of the right bearing hole 47b for supporting the driven balancer shaft 25. In the same manner as in the bearing holes 37a and 37b, needle rolling bearings 41 and 41 are inserted into the bearing holes 47a and 47b.

Approximately cylindrical mounting eyes 47c and 47d are respectively formed at both ends, in the lateral direction, of the rear bearing wall 47, and project upward from the top of the rear bearing wall 47. Mounting holes 47e and 47f which vertically penetrate the rear bearing wall 47 and through which bolts for fixing the balancer housing 7 are inserted, are formed at the centers of these mounting eyes 47c and 47d. In the same manner as in the front bearing wall 37, approximately the lower half of a positioning pin 47g is inserted in the right mounting hole 47f. This pin 47g is used as a positioning pin to be inserted in a bolt insertion hole 21l formed in the bottom surface of the lower block 21. The height of the rear bearing wall 47 is larger than that of the front bearing wall 37. The bottom end of the rear bearing wall 47 is located below the bottom end of the front bearing wall 37.

Figure 9:
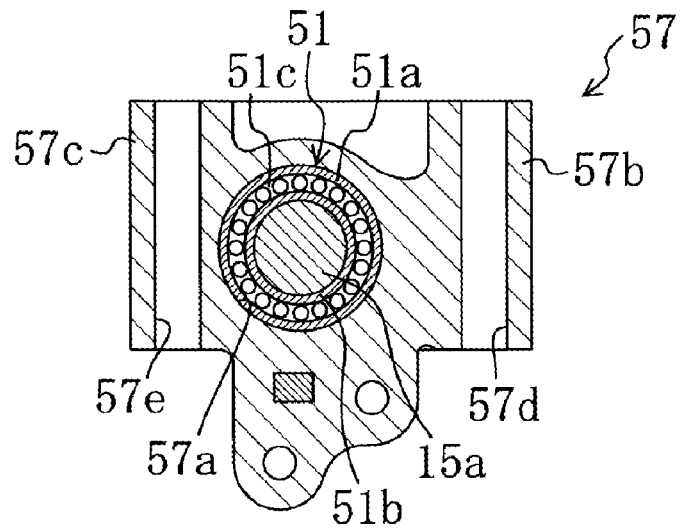
FIG. 9 is a cross-sectional view taken along line IX-IX in FIG. 3.

As illustrated in FIG. 9, a bearing hole 57a is formed through the distal bearing wall 57 to extend in the fore and aft direction and rotatably support the front end (i.e., the front end of the shaft extension 15f) of the driving balancer shaft 15. A needle rolling bearing 51 is inserted into the bearing hole 57a. Approximately cylindrical mounting eyes 57b and 57c are respectively formed at both ends, in the lateral direction, of the distal bearing wall 57, and project upward from the top of the distal bearing wall 57. Mounting holes 57d and 57e which vertically penetrate an end portion of the distal bearing wall 57 and through which bolts for fixing the balancer housing 7 are inserted, are formed at the centers of the mounting eyes 57b and 57c.

As illustrated in FIGS. 7-9, among the bearing holes 37a, 47a, and 57a for supporting the driving balancer shaft 15, the bearing hole 57a of the distal bearing wall 57 has the smallest inner diameter, and the bearing hole 47a of the rear bearing wall 47 has the largest inner diameter. On the other hand, between the bearing holes 37b and 47b for supporting the driven balancer shaft 25, the inner diameter of the bearing hole 37b of the front bearing wall 37 is smaller than the bearing hole 47b of the rear bearing wall 47.

Figure 10:
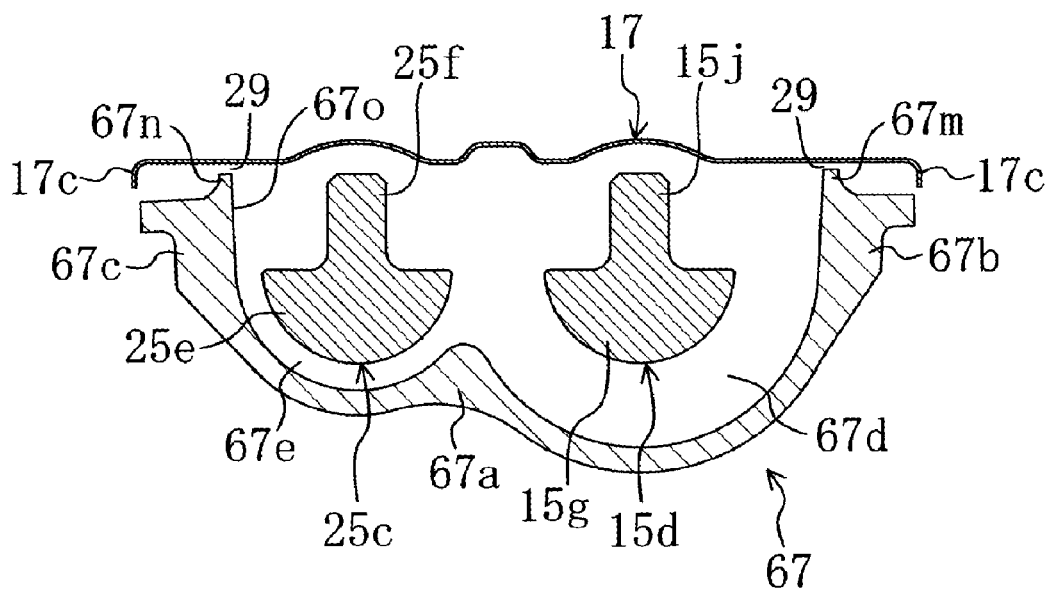
FIG. 10 is a cross-sectional view taken along line X-X in FIG. 3.

The housing body 67 extends in the fore and aft direction to couple the front bearing wall 37 and the rear bearing wall 47. As illustrated in FIG. 10, the housing body 67 includes: a bottom wall 67a; and side walls 67b and 67c extending from both ends, in the lateral direction, of this bottom wall 67a. The side walls 67b and 67c are open (i.e., have apertures 67o) at the tops thereof.

When viewed from the front side of the engine, the bottom wall 67a has two downward protuberances whose both ends in the lateral direction are smoothly coupled to the side walls 67b and 67c. In this manner, two main-weight housings 67d and 67e disposed side by side in the lateral direction and housing main-weight parts 15d and 25c (i.e., balancer weight parts), which will be described later, of the respective balancer shafts 15 and 25, are formed in the housing body 67.

The left main-weight housing 67d housing the main-weight part 15d of the driving balancer shaft 15 has a volume larger than that of the right main-weight housing 67e housing the main-weight part 25c of the driven balancer shaft 25. The bottom wall 67a has three drain oil openings 67f, 67g, and 67h for gravity drain of lubricating oil (or oil) accumulated in the main-weight housings 67d and 67e (see, FIG. 6). The bottom wall 67a projects below the bottom end of the front bearing wall 37, and has its bottom end (i.e., the vertex of the left protuberance) located approximately at the same level as the bottom end of the rear bearing wall 47.

On the other hand, the top ends of the side walls 67b and 67c are located below the top ends of the front and rear bearing walls 37 and 47. Two bosses 67i and 67j; 67k and 67l for attaching the housing cover 17 project on each of the top surfaces of the side walls 67b and 67c are spaced apart from each other in the fore and aft direction (see, FIG. 6), and ridges 67m and 67n are formed on, and project upward from, the inner end portion, in the lateral direction, of the top surfaces of the side walls 67b and 67c, and extend in the fore and aft direction. The top ends of these ridges 67m and 67n are located below the top ends of the bosses 67i, 67j, 67k, and 67l.

Figure 11:
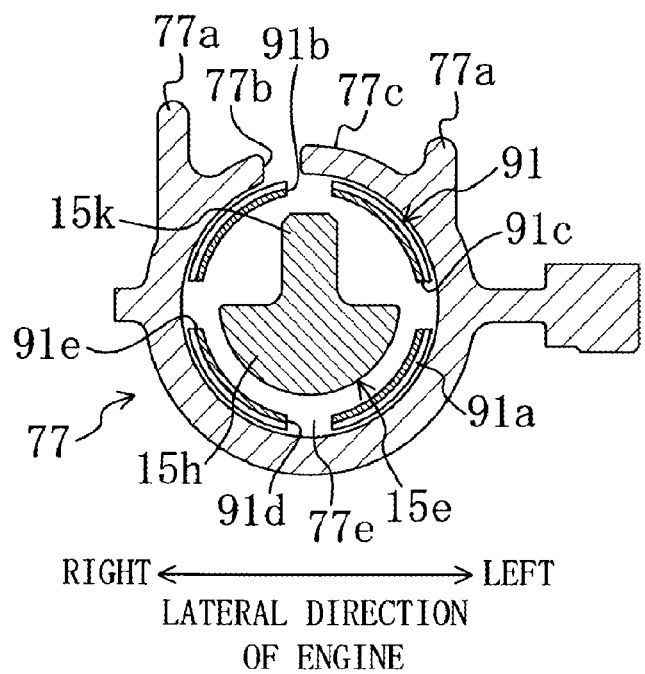
FIG. 11 is a cross-sectional view taken along line XI-XI in FIG. 3.

The housing extension 77 extends in the fore and aft direction to couple the distal bearing wall 57 and the front bearing wall 37 to each other, and has an approximately cylindrical shape as illustrated in FIG. 11. In this housing extension 77, a sub-weight housing 77e for housing a sub-weight part 15e, which will be described later, of the shaft extension 15f of the driving balancer shaft 15.

The front end of this housing extension 77 has a lubrication hole 77b for supplying lubricating oil vertically penetrating a portion of the housing extension 77 near the top thereof. The upper half of the outer surface of the housing extension 77 is provided with walls 77a surrounding the lubrication hole 77b to form L-shaped space in plan view and extending upward. The space which has an L-shape in plan view and is surrounded with the walls 77a forms an oil collection part 77c having an open top and collecting oil dropped from the engine body 1. The lubrication hole 77b forms an oil supply hole for supplying oil collected in the oil collection part 77c to needle rolling bearings 31 and 51 inserted into the bearing holes 37a and 57a of the front and distal bearing walls 37 and 57. This oil supply hole allows the inside of the oil collection part 77c to communicate with the inside of the housing extension 77. The lubrication hole 77b and the walls 77a form part of a first lubricating-oil passageway 93 which will be described later.

An approximately cylindrical spacer 91 is inserted in the sub-weight housing 77e. This spacer 91 provides spacing, in the fore and aft direction, between the needle rolling bearings 51 and 31 provided in the bearing holes 57a and 37a of the distal and front bearing walls 57 and 37. The spacer 91 has: an annular trench 91a formed at a position associated with the lubrication hole 77b in the fore and aft direction and extending along the entire periphery of the outer surface of the spacer 91; and four supply through holes 91b, 91c, 91d, and 91e penetrating the spacer 91 laterally and vertically. Out of these supply through holes 91b, 91c, 91d, and 91e, the top and bottom supply through holes 91b and 91d vertically penetrating the spacer 91 are disposed in the vertical direction so as to overlap with part of the lubrication hole 77b in plan view. The annular trench 91a and the supply through holes 91b, 91c, 91d, and 91e also form part of the first lubricating-oil passageway 93.

Figure 12:
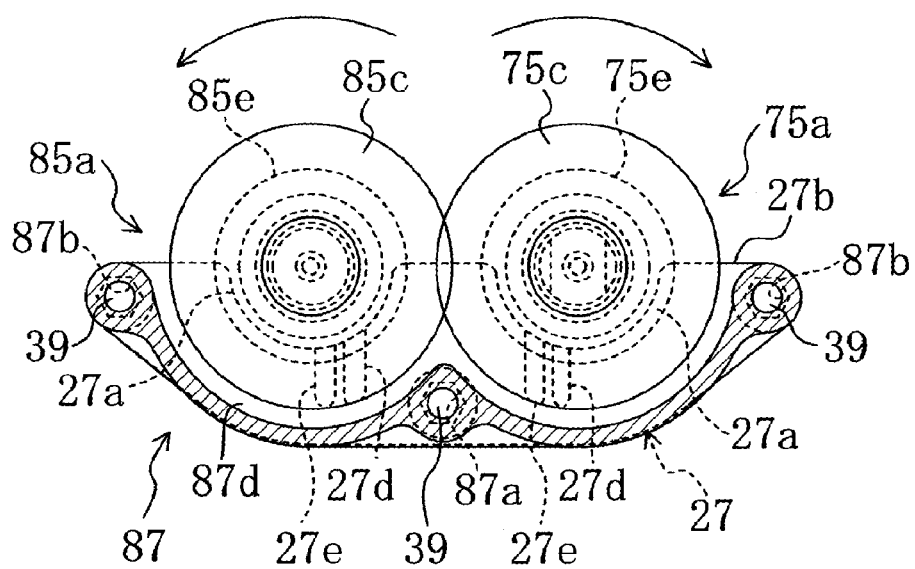
FIG. 12 is a cross-sectional view taken along line XII-XII in FIG. 3.
Figure 16:
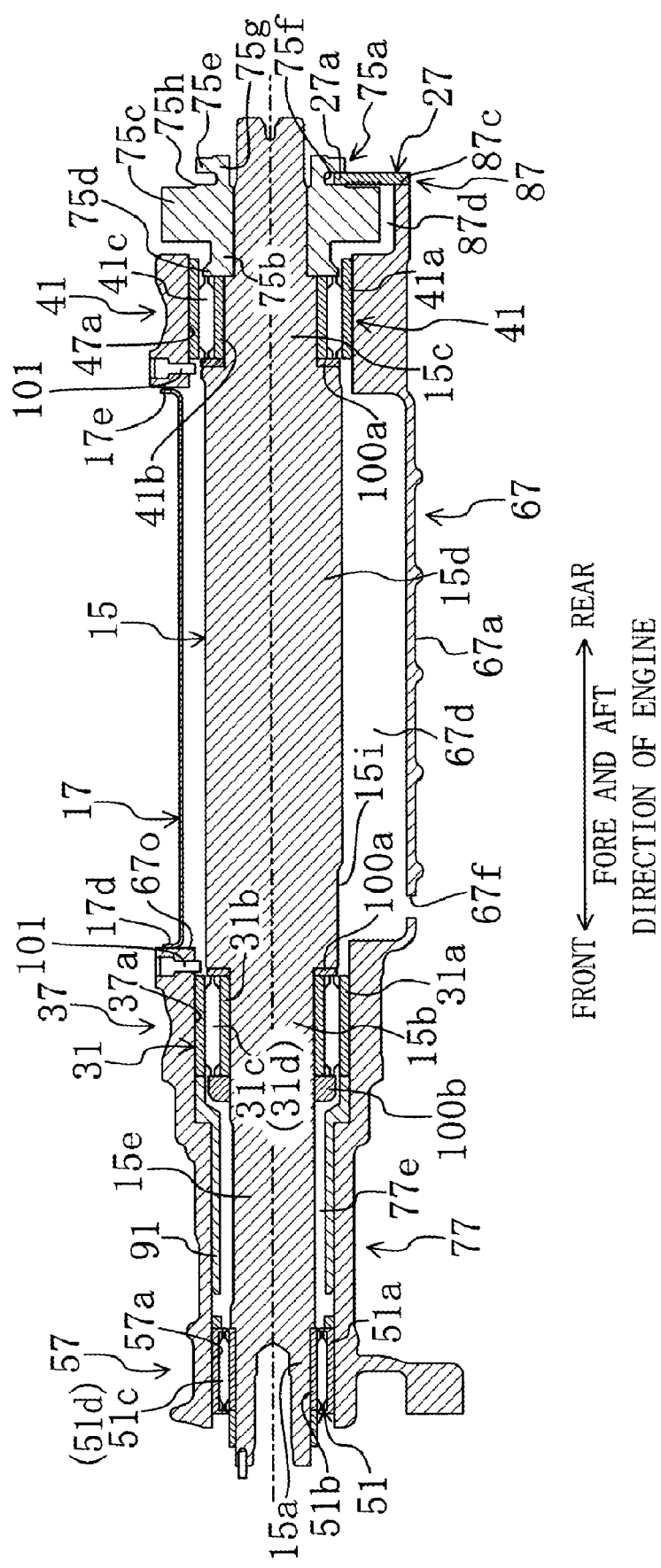
FIG. 16 is a cross-sectional view taken along line XVI-XVI in FIG. 2.

The gear housing 87 further extends rearward from the rear end surface of the rear bearing wall 47 to be provided at the rear end of the balancer housing 7. As illustrated in FIG. 12, when viewed from the front side of the engine, the gear housing 87 has two downward protuberances so as to house approximately lower halves of the engaging gears 75a and 85a provided in the respective balancer shafts 15 and 25 and configured to implement synchronous rotation of the balancer shafts 15 and 25. Three bolt insertion holes 87a, 87b, and 87b for attaching the thrust plate 27 are respectively formed at the center and both ends in the rear end of the gear housing 87. As illustrated in FIG. 16, the thrust plate 27 is attached to the rear end (i.e., the open end) 87c of the gear housing 87, thereby forming a gear housing room 87d which is open at the top and covers approximately lower halves of the engaging gears 75a and 85a.

With the foregoing configuration of the components constituting the balancer housing 7, the balancer housing 7 as a whole has a substantially box shape which has the aperture 67o at the top and is open at the rear end. The left portion of the gear housing 87, the left bearing hole 47a of the rear bearing wall 47, the left main-weight housing 67d, the left bearing hole 37a of the front bearing wall 37, the sub-weight housing 77e, and the bearing hole 57a of the distal bearing wall 57 form a space for housing the driving balancer shaft 15. On the other hand, the right portion of the gear housing 87, the right bearing hole 47b of the rear bearing wall 47, the right main-weight housing 67e, and the right bearing hole 37b of the front bearing wall 37 form a space for housing the driven balancer shaft 25.

Figure 13:
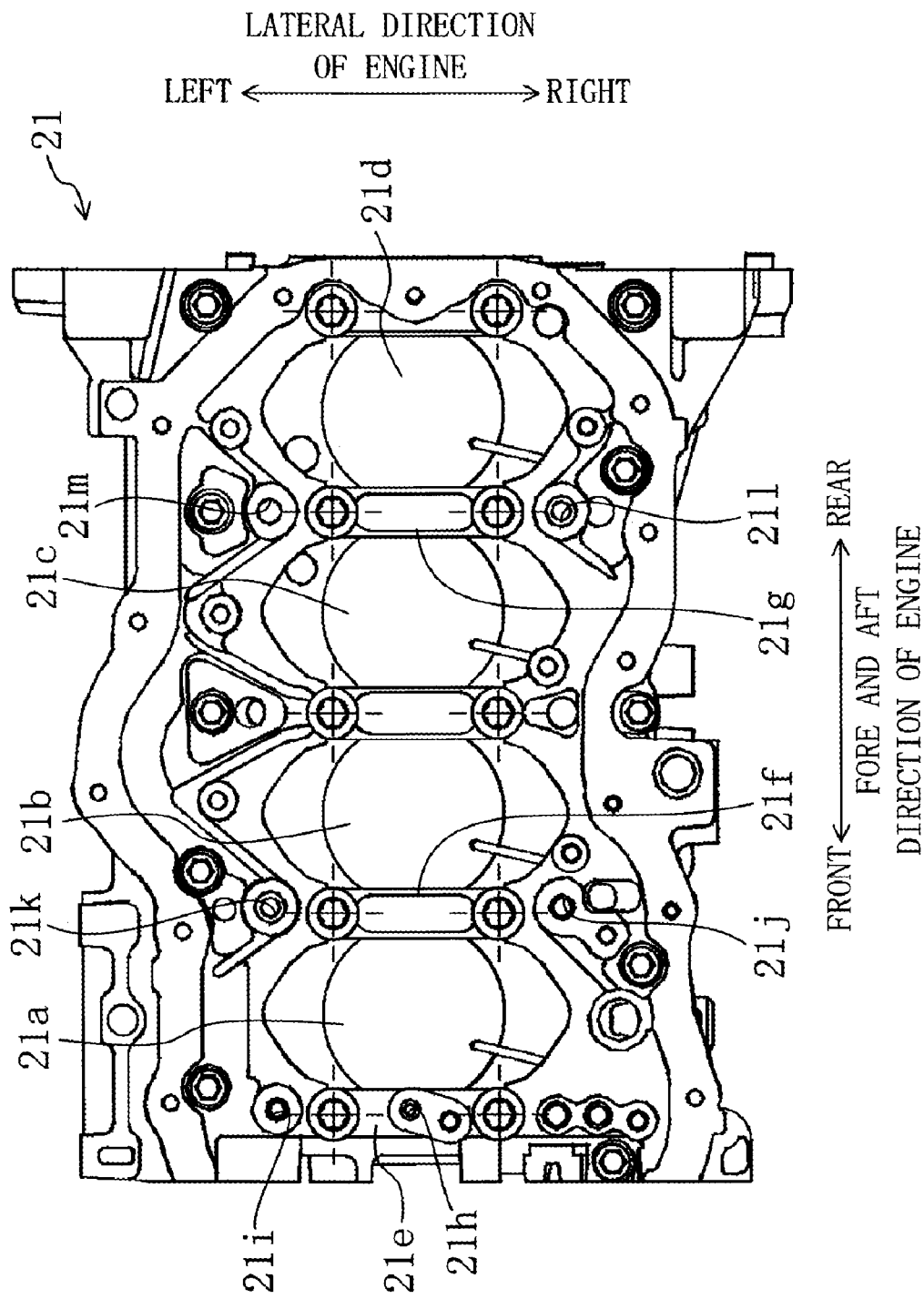
FIG. 13 is a bottom view of a lower block.

The balancer housing 7 is located at the bottom of the engine body 1 by attaching the bearing walls 37, 47, and 57 to bearing walls 21e, 21f, and 21g (see, FIG. 13) provided in the lower block 21 (i.e., the engine body 1) and used for supporting the crankshaft 9. More specifically, the distal bearing wall 57 is attached to the bearing wall 21e located in front of a first cylinder 21a, by tightening bolts inserted in the mounting holes 57d and 57e to bolt insertion holes 21h and 21i formed in the bottom surface of the lower block 21. The front bearing wall 37 is attached to the bearing wall 21f located between the first cylinder 21a and a second cylinder 21b, by tightening bolts inserted in the mounting holes 37e and 37f to bolt insertion holes 21k and 21j formed in the bottom surface of the lower block 21. The rear bearing wall 47 is attached to the bearing wall 21g located between a third cylinder 21c and a fourth cylinder 21d, by tightening bolts inserted in the mounting holes 47e and 47f to bolt insertion holes 21m and 21l formed in the bottom surface of the lower block 21.

Figure 14:
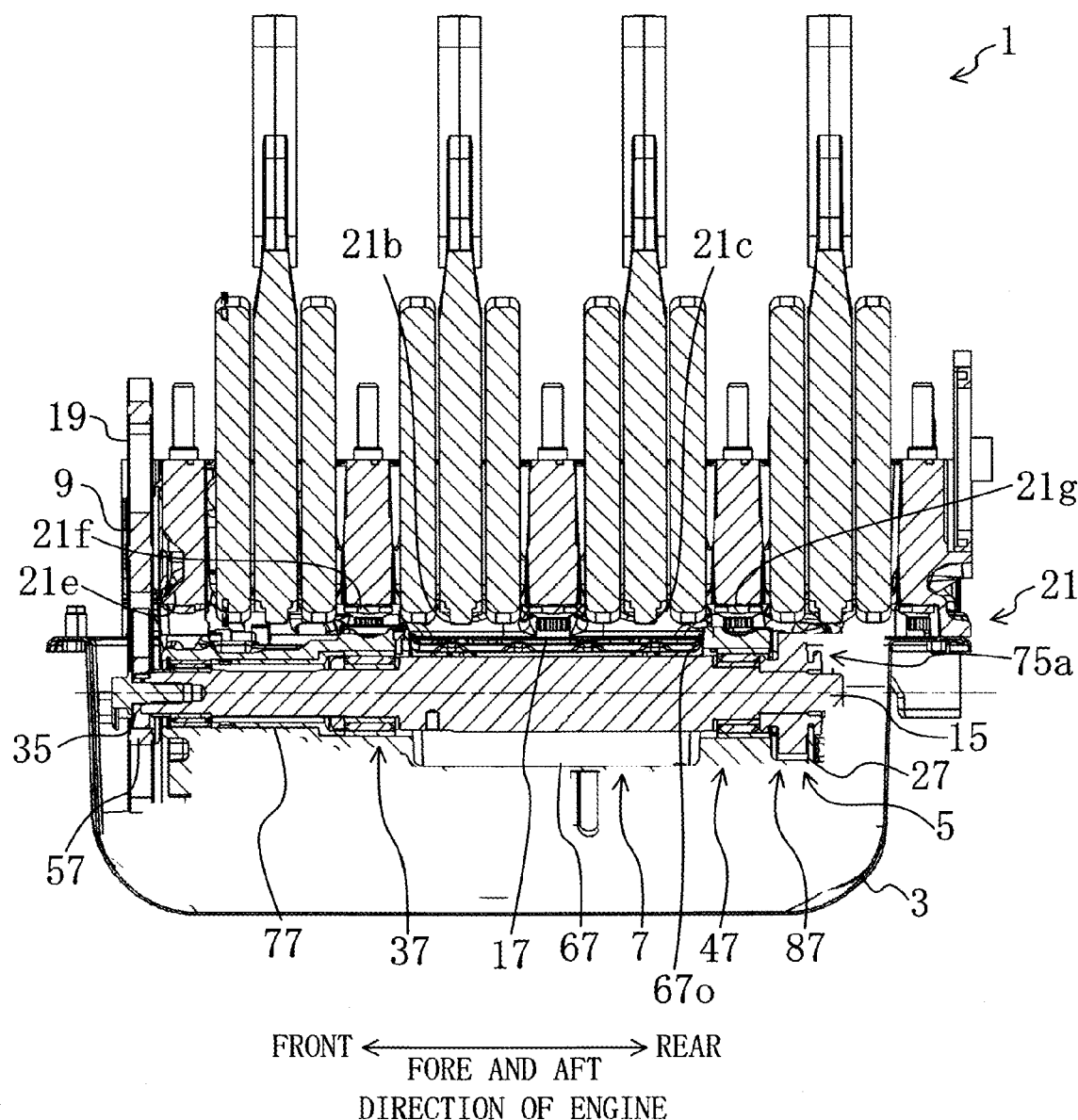
FIG. 14 is a cross-sectional view taken along line XIV-XIV in FIG. 1.

In this manner, the front and rear bearing walls 37 and 47 are attached to the bearing walls 21f and 21g located at the front and rear of two adjacent cylinders (i.e., the second and third cylinders 21b and 21c), and thereby, the aperture 67o of the balancer housing 7 extends across the second and third cylinders 21b and 21c, as illustrated in FIG. 14.

—Balancer Shaft—

Figure 15:
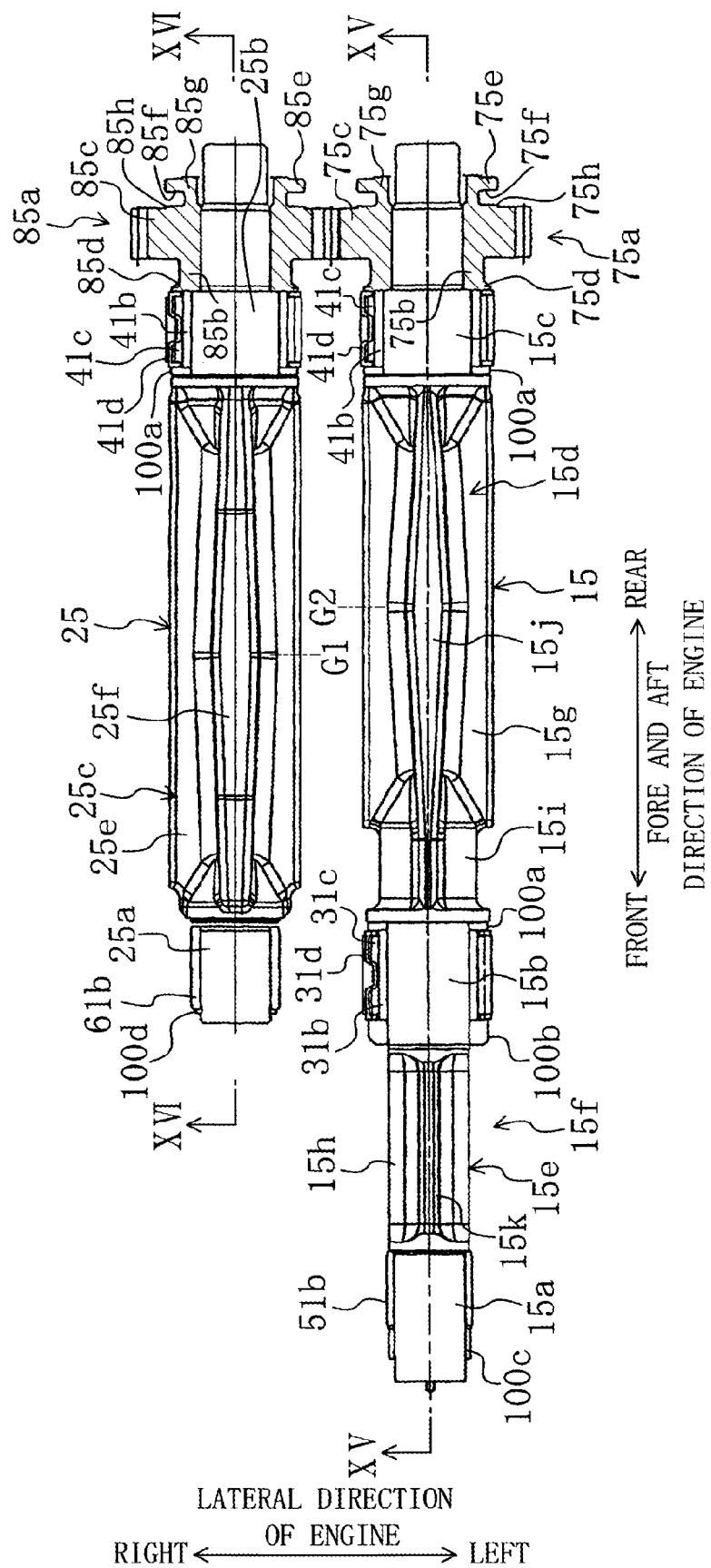
FIG. 15 is a plan view of driving and driven balancer shafts.
Figure 17:
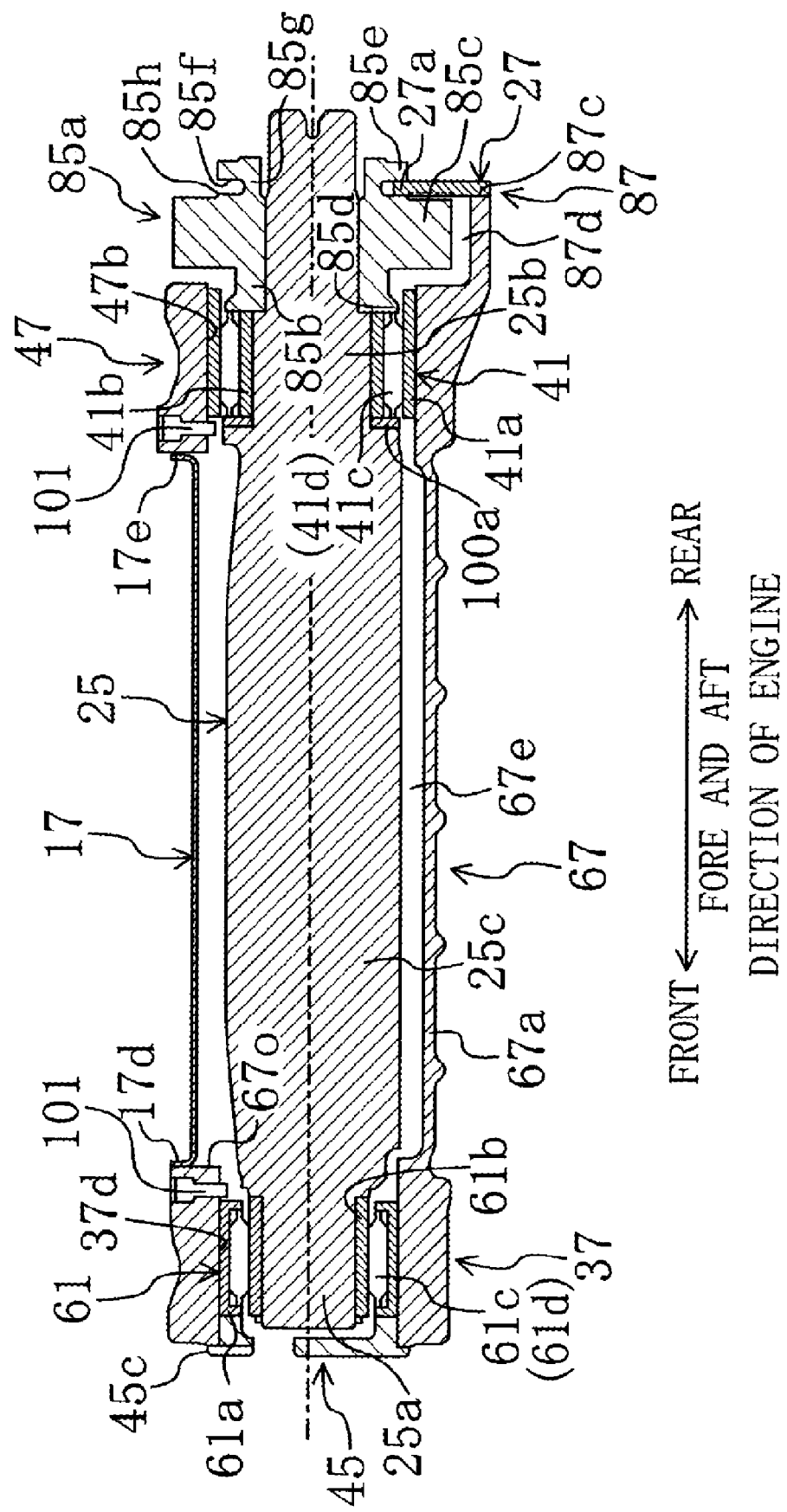
FIG. 17 is a cross-sectional view taken along line XVII-XVII in FIG. 2.

As illustrated in FIGS. 15-17, the driving and driven balancer shafts 15 and 25 are positioned to extend in the fore and aft direction in the balancer housing 7. The driving balancer shaft 15 is rotatably supported by the bearing holes 37a, 47a, and 57a respectively formed in the front bearing wall 37, the rear bearing wall 47, and the distal bearing wall 57, whereas the driven balancer shaft 25 is rotatably supported by the bearing holes 37b and 47b respectively formed in the front bearing wall 37 and the rear bearing wall 47. The front end of the driving balancer shaft 15 further extends forward beyond the front end of the driven balancer shaft 25. In other words, the driving balancer shaft 15 has the shaft extension 15f extending forward beyond the driven balancer shaft 25. The shaft axes of the balancer shafts 15 and 25 are arranged in parallel with each other so as to be symmetric in the same plane with respect to the vertical plane passing through the shaft axis of the crankshaft 9.

The driving balancer shaft 15 includes: a distal journal 15a; a front journal 15b; a rear journal 15c; a main-weight part 15d; a sub-weight part 15e; and an engaging gear 75a. A driven sprocket (i.e., a driving-power transmission part) 35 is attached to a portion (i.e., the tip) of the driving balancer shaft 15 located in front of the distal journal 15a. The driving balancer shaft 15 is configured to be driven by receiving driving power from the crankshaft 9 through the driven sprocket 35.

The distal, front, and rear journals 15a, 15b, and 15c are respectively supported by the bearing holes 57a, 37a, and 47a formed in the distal, front, and rear bearing walls 57, 37, and 47 with the needle rolling bearings 51, 31, and 41 provided on the outer peripheries of the distal, front and rear journals 15a, 15b, and 15c. In this manner, supporting the driving balancer shaft 15 by a portion (i.e., the distal journal 15a) of the driven sprocket 35 can reduce bending of the axis of the shaft extension 15f, thereby reducing vibration of the driven sprocket 35. Among the distal, front and rear journals 15a, 15b, and 15c, the distal journal 15a has the smallest outer diameter, and the rear journal 15c has the largest outer diameter.

The needle rolling bearings 31, 41, and 51 include: annular outer races 31a, 41a, and 51a fitted internally, and fixed, to the inner surfaces of the bearing holes 37a, 47a, and 57a so as to be unrotatable; annular inner races 31b, 41b, and 51b fitted internally, and fixed, to the outer surfaces of the journals 15b, 15c, and 15a so as to be unrotatable; a plurality of needle rollers 31c, 41c, and 51c provided between the outer races 31a, 41a, and 51a and the inner races 31b, 41b, and 51b, respectively; and annular holders 31d, 41d, and 51d holding these needle rollers 31c, 41c, and 51c so as to allow rolling motion of the needle rollers 31c, 41c, and 51c in the peripheral direction.

The holders 31d, 41d, and 51d are configured to rotate in the bearing holes 37a, 47a, and 57a according to the rolling motion of the needle rollers 31c, 41c, and 51c. Among the three needle rolling bearings 31, 41, and 51, only the outer race 51a of the needle rolling bearing 51 placed on the distal journal 15a has a U shape in cross section, and the needle roller 51c and the holder 51d are incorporated therein beforehand.

On the other hand, the outer races 31a and 41a of the needle rolling bearings 31 and 41 placed on the front and rear journals 15b and 15c have simple cylindrical shapes, and a preassembly unit of the associated needle rollers 31c and 41c and holders 31d and 41d are separated from the outer races 31a and 41a, as illustrated in FIG. 15. The outer race 41a of the needle rolling bearing 41 placed on the rear journal 15c extends rearward beyond the inner race 41b and the holder 41d, and surrounds the entire periphery of the front end of the engaging gear 75a.

The main-weight part 15d is located between the front journal 15b and the rear journal 15c, and is housed in the left main weight housing 67d of the housing body 67. As illustrated in FIG. 10, this main-weight part 15d has an approximately semicircular shape in order to provide weight imbalance by forming a recess in an approximately semicircular region of the outer surface of the driving balancer shaft 15 such that the recess becomes symmetric with respect to the vertical plane passing through the shaft axis of the driving balancer shaft 15 when viewed from the front side of the engine. In other words, the main-weight part 15d has an approximately semicylincrical mass portion 15g whose barycenter is eccentric from the shaft center.

In addition, no eccentric portion (i.e., the mass portion 15g) is formed in a portion 15i near the front journal 15b of the main-weight part 15d. Accordingly, the barycenter G2 of the main-weight part 15d is located at a position closer to the rear, than that of an eccentric portion formed between the front journal 15b and the rear journal 15c (see, FIG. 15).

The main-weight part 15d is formed to have an outer diameter of its rotational path larger than the outer diameter of the front and rear journals 15b and 15c. More specifically, the outer diameter of rotational path of the main-weight part 15d is larger than the outer diameter of the inner race 31b of the needle rolling bearing 31 fitted into the front journal 15b, but is smaller than the inner diameter of the outer race 41a of the needle rolling bearing 41 fitted into the rear journal 15c.

The sub-weight part 15e is located between the distal journal 15a and the front journal 15b, and is housed in the sub-weight housing 77e of the housing body 67. This sub-weight part 15e has an approximately semicircular shape in order to provide weight imbalance by forming a recess in an approximately semicircular region of the outer surface of the driving balancer shaft 15 such that the recess becomes symmetric with respect to the vertical plane passing through the shaft axis of the driving balancer shaft 15 when viewed from the front side of the engine. In other words, the sub-weight part 15e has an approximately semicylincrical mass portion 15h whose barycenter is eccentric from the shaft center.

The outer diameter of rotational path of this sub-weight part 15e is smaller than the outer diameter of the main-weight part 15d, and is approximately equal to the outer diameters of the distal and front journals 15a and 15b.

The engaging gear 75a is adjacent to the rear of the needle rolling bearing 41 (i.e., the rolling bearing) of the driving balancer shaft 15 at the rear end of the main-weight part 15d, and includes: a gear body 75c fitted with the driving balancer shaft 15; a front cylinder 75b (i.e., a movement restriction part) extending forward from the front end surface of the gear body 75c to the inside of the outer race 41a of the needle rolling bearing 41; and a rear cylinder 75g extending rearward from the rear end surface of the gear body 75c.

The gear body 75c is made of a helical gear which is engaged with a gear body 85c (i.e., a helical gear), which will be described later, of the driven balancer shaft 25. An annular step 75h surrounding the rear cylinder 75g when viewed from the rear side of the engine is formed in the rear side surface of the gear body 75c.

An annular projection 75d projecting radially outwardly is formed on the front end of the outer surface of the front cylinder 75b, whereas an annular flange 75e extending radially outwardly is formed on the rear end of the outer surface of the rear cylinder 75g.

The annular projection 75d provides space in the fore and aft direction between the annular projection 75d and a ring plate 100a located at the front end edge of the rear journal 15c, and restricts the movement in the fore and aft direction of the holder 41d of the needle rolling bearing 41 placed on the rear journal 15c. The tip in the radial direction (i.e., the outer surface) of this annular projection 75d is located closer to the inner surface of the outer race 41a of the needle rolling bearing 41, thereby restricting an excess supply of oil scattered with the rotation of the engaging gear 75a to the needle rolling bearing 41.

The position of the outer surface of the annular flange 75e approximately matches the position of the outer surface of the step 75h when viewed from the rear of the engine. The annular flange 75e forms an annular thrust control trench 75f together with the step 75h and the rear cylinder 75g. A thrust control portion 27a, which will be described later, of the thrust plate 27 is fitted into this thrust control trench 75f. The thrust control trench 75f is slidable along the thrust control portion 27a.

Movement in the fore and aft direction of a holder 31d of the needle rolling bearing 31 supporting the front journal 15b is controlled with the ring plates 100a and 100b disposed at, and fixed to, both sides, in the fore and aft direction, of the inner race 31b fitted internally, and fixed, to the front journal 15b.

On the other hand, the driven balancer shaft 25 includes: a front journal 25a; a rear journal 25b; a main-weight part 25c; and an engaging gear 85a.

The front and rear journals 25a and 25b are respectively supported by the bearing holes 37b and 47b formed in the front and rear bearing walls 37 and 47 with the needle rolling bearings 61 and 41 placed on the outer surfaces thereof. Between the journals 25a and 25b, the outer diameter of the rear journal 25b is larger than the outer diameter of the front journal 25a.

In the same manner as the needle rolling bearings 31, 41, and 51 provided in the driving balancer shaft 15, the needle rolling bearings 61 and 41 respectively include: annular outer races 61a and 41a; annular inner races 61b and 41b; a plurality of needle rollers 61c and 41c; and annular holders 61d and 41d. In the needle rolling bearing 61 placed on the front journal 25a, the outer race 61a and the holder 61d are integrated. In the needle rolling bearing 41 placed on the rear journal 25b, the outer race 41a extends rearward beyond the inner race 41b and the holder 41d, and surrounds the entire periphery of the front end of the engaging gear 85a.

The main-weight part 25c is formed between the front journal 25a and the rear journal 25b, and is housed in the right main weight housing 67e of the housing body 67. As the main-weight part 15d of the driving balancer shaft 15, this main-weight part 25c has an approximately semicircular shape in order to provide barycenter imbalance by forming a recess in an approximately semicircular region of the outer surface of the driven balancer shaft 25. In other words, the main-weight part 25c has an approximately semicylincrical mass portion 25e whose barycenter is eccentric from the shaft axis of the balancer shaft.

The outer diameter of rotational path of the main-weight part 25c is larger than those of the front and rear journals 25a and 25b. More specifically, the outer diameter of rotational path of the main-weight part 25c is larger than the outer diameter of the inner race 61b of the needle rolling bearing 61 fitted into the front journal 25a, and is smaller than the inner diameter of the outer race 41a of the needle rolling bearing 41 fitted into the rear journal 25b.

The reinforcing rib 15j, 25f is formed integrally with the mass portion 15g, 25e between the front journal 15b, 25a and the rear journal 15c, 25b of the driving or driven balancer shaft 15, 25. A reinforcing rib 15k is formed integrally with the mass portion 15h between the distal journal 15a and the front journal 15b of the driving balancer shaft 15. In this manner, the journals are reinforced against axis bending.

The engaging gear 85a is provided adjacent to the rear of the needle rolling bearing 41 of the driven balancer shaft 25 at the rear end of the driven balancer shaft 25 at the rear of the main-weight part 25c. As the engaging gear 75a of the driving balancer shaft 15, the engaging gear 85a includes: a gear body 85c; a front cylinder 85b (i.e., a movement restriction part); and a rear cylinder 85g.

The gear body 85c is made of a helical gear which has the same diameter as the gear body 75c of the driving balancer shaft 15 and is engaged with the gear body 75c. In this manner, both of the gear bodies 75c and 85c of the driving and driven balancer shafts 15 and 25 are made of helical gears, thereby reducing noise during the rotation of these balancer shafts 15 and 25. In addition, an annular step 85h is formed in the rear side surface of the gear body 85c to surround the rear cylinder 85g when viewed from the rear side of the engine.

An annular projection 85d projecting radially outwardly is formed in the front end of the outer surface of the front cylinder 85b, whereas an annular flange 85e extending radially outwardly is formed in the rear end of the outer surface of the rear cylinder 85g. These annular projection 85d and annular flange 85e have substantially the same functions as the annular projection 75d and the annular flange 75e of the driving balancer shaft 15. The location and structure of the needle rolling bearing 41 at the rear end of the driven balancer shaft 25 are substantially the same as those of the needle rolling bearing 41 of the driving balancer shaft 15 including the ring plate 100a, and thus description thereof is omitted.

With the foregoing configuration, in the driving and driven balancer shafts 15 and 25, when the driving balancer shaft 15 is driven by receiving driving power from the crankshaft 9 through the driven sprocket 35, the engaging gear 75a of the driving balancer shaft 15 and the engaging gear 85a of the driven balancer shaft 25 are engaged with each other, thereby providing synchronous rotation and producing a thrust in opposite directions in the fore and aft direction.

In this manner, the synchronous rotation of the driving balancer shaft 15 and the driven balancer shaft 25 causes the mass portion 15g of the main-weight part 15d of the driving balancer shaft 15 and the mass portion 25e of the main-weight part 25c of the driven balancer shaft 25 to synchronously rotate in opposite directions, while being always at the same height. Since the balancer shafts 15 and 25 rotate at high speed in the directions indicated by the arrows in FIG. 12, oil which has entered the left and right main-weight housings 67d and 67e is swept diagonally upward by the mass portions 15g and 25e.

The driven sprocket 35 of the driving balancer shaft 15 is a small-diameter gear in which the number of teeth is half of that in the driving sprocket 19 of the crankshaft 9, thereby allowing the driving and driven balancer shafts 15 and 25 to rotate with a number of rotations twice as large as that of the engine.

As described above, the driving balancer shaft 15 includes the shaft extension 15f extending forward beyond the driven balancer shaft 25, and is driven by receiving driving power from the crankshaft 9 through the driven sprocket 35 at the tip of the shaft extension 15f. However, in a conventional balancer in which such an extension (i.e., a portion between a distal journal and a front journal) is merely a shaft part, and a weight part is provided only between the front journal and the rear journal, an eccentric load in the axial direction causes imbalance in rotation of the shaft extension 15f, thereby causing additional axis bending of the shaft extension 15f of the driving balancer shaft 15. In particular, the front journal 15b and the needle rolling bearing 31 serving as bearings in an intermediate portion of the driving balancer shaft 15 are not in surface contact, which is employed between conventional metal bearings, but are in line contact with each other. Accordingly, uneven distribution of loads can occur in rotation with tilt caused by axis bending, and thus a new problem can arise in the bearing configuration.

In contrast, in the balancer 5 described above, the shaft extension 15f has the sub-weight part 15e, and thus imbalance in load in the axial direction can be reduced, thereby reducing axis bending of the driving balancer shaft 15.

In the configuration where the shaft extension 15f has the sub-weight part 15e, the barycenter of the weight part of the driving balancer shaft 15 (i.e., the barycenter of a total of the sub- and main-weight parts 15d and 15e) shifts forward from the barycenter of the weight part (i.e., only the main-weight part) of a conventional balancer, thereby causing a shift between the barycenter of the weight parts 15d and 15e of the driving balancer shaft 15 and the barycenter G1 of the main-weight part 25c of the driven balancer shaft 25. In this state, it is difficult to reduce vibration due to rotational imbalance of the crankshaft 9.

To avoid this problem, as illustrated in FIG. 15, the balancer 5 has a configuration in which the position of the barycenter G2 of the main-weight part 15d of the driving balancer shaft 15 is adjusted such that the barycenter of the weight parts 15d and 15e of the driving balancer shaft 15 matches the barycenter G1 of the main-weight part 25c of the driven balancer shaft 25.

Specifically, as described above, the main-weight part 15d of the driving balancer shaft 15 has no eccentric portions in the portion 15i near the front journal 15b between the front journal 15b and the rear journal 15c. Accordingly, the barycenter G2 of the main-weight part 15d of the driving balancer shaft 15 is located closer to the rear, than the barycenter G1 of the main-weight part 25c of the driven balancer shaft 25 having the eccentric portion between the front journal 25a and the rear journal 25b.

In other words, the barycenter G2 of the main-weight part 15d of the driving balancer shaft 15 is located closer to the rear than the barycenter G1 of the main-weight part 25c of the driven balancer shaft 25. This configuration can reduce forward movement of the barycenter of the weight parts 15d and 15e, and the barycenter of the weight parts 15d and 15e of the driving balancer shaft 15 matches the barycenter G1 of the main-weight part 25c of the driven balancer shaft 25.

In this manner, it is possible to reduce vibration due to rotational imbalance of the crankshaft 9, while reducing bending of the axis of the driving balancer shaft 15.

—Housing Cover—

Figure 3:
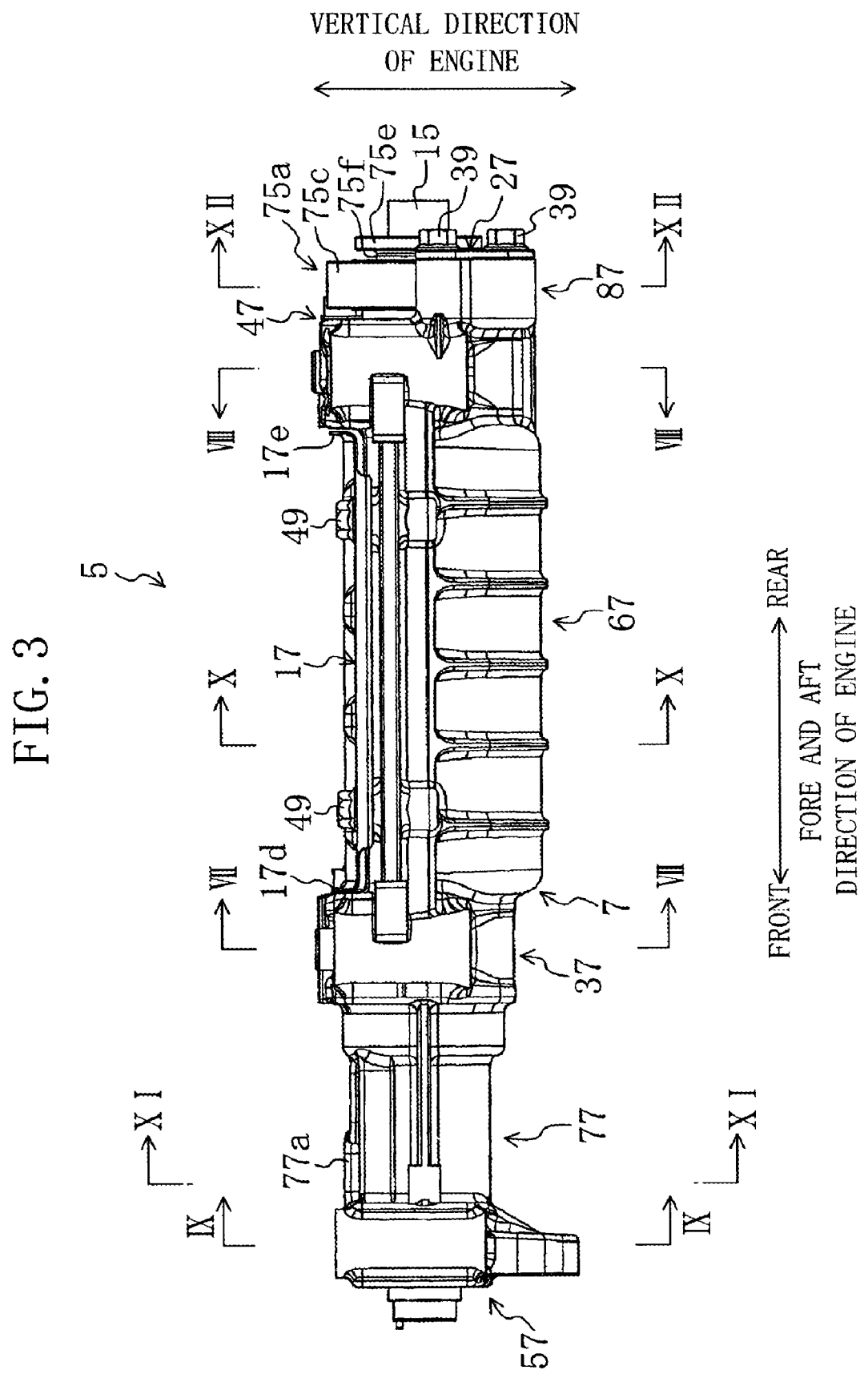
FIG. 3 is a left side view of the balancer.

The housing cover (i.e., a cover member) 17 is made of a pressed steel plate, and as illustrated in FIG. 3, is tightened to the bosses 67i, 67j, 67k, and 67l projecting from the top of the side walls 67b and 67c of the housing body 67 with the bolts (e.g., 49, 49) so as to cover the aperture 67o of the housing body 67. The housing cover 17 is located below the tops of the mounting eyes 37c, 37d, 47c, and 47d. The housing cover 17 provided in this manner can reduce unwanted flow of oil supplied to the bearing (not shown) of the crankshaft 9 or used for piston cooling, into the main-weight housings 67d and 67e even in the configuration in which the housing body 67 forming the main-weight housings 67d and 67e has an aperture 67o at the top thereof and the aperture 67o is formed across the second and third cylinders 21b and 21c.

The housing cover 17 is in the shape of a plate thinner than a member forming the housing body 67, and has its stiffness increased by forming a plurality of projecting ribs (e.g., 17a, 17b) extending in the fore and aft direction and in the lateral direction. As illustrated in FIG. 10, the housing cover 17 extends along the outer periphery of rotational path of the main-weight parts 15d and 25c in cross section. In other words, the housing cover 17 has two upward protuberances when viewed from the front side of the engine. In this manner, the housing cover 17 can be located closer to the main-weight parts 15d and 25c. This positioning, together with the small thickness of the housing cover 17, can reduce the height of the balancer housing 7. Accordingly, the axes of the balancer shafts 15 and 25 can be located closer to the engine.

In addition, the housing cover 17 extends laterally outwardly beyond both sides, in the lateral direction, of the housing body 67. More specifically, the housing cover 17 extends to a portion near the outer side edges of the side walls 67b and 67c beyond the ridges 67m and 67n formed on the inner side edges of the side walls 67b and 67c of the housing body 67, and the housing cover 17 has downward bending portions 17c, 17c at both ends thereof.

Further, the presence of the bosses (e.g., 67i, 67j, 67k) described above provides gaps 29 and 29 between the housing cover 17 and the ridges 67m and 67n, thereby allowing the inside of the housing body 67 to communicate with the outside through these gaps 29 and 29.

With this configuration, oil swept upward according to the rotation of the main-weight parts 15d and 25c in the main-weight housings 67d and 67e passes through the gaps 29 and 29 to be drained to outside the balancer housing 7. More specifically, oil which has entered the main-weight housings 67d and 67e is swept diagonally upward by the mass portions 15g and 25e as described above, and strikes the bottom surface of the housing cover 17 through the gaps 29 and 29. The oil which has struck the bottom surface of the housing cover 17 is guided by the bending portions 17c and 17c to be drained to outside the balancer housing 7. The ridges 67m and 67n inhibit oil which has passed through the gaps 29 and 29 from returning to the main-weight housings 67d and 67e. In this manner, oil which has entered the balancer housing 7 is drained before being accumulated therein.

The housing cover 17 additionally has upward bending portions 17d and 17e at both sides thereof in the fore and aft direction. The front surface of the front bending portion 17d is close to the rear end surface of the front bearing wall 37, and the rear surface of the rear bending portion 17e is close to the front end surface of the rear bearing wall 47. This configuration can prevent oil which has accumulated on the upper surface of the housing cover 17 from entering the main-weight housings 67d and 67e.

—Thrust Plate—

Figure 5:
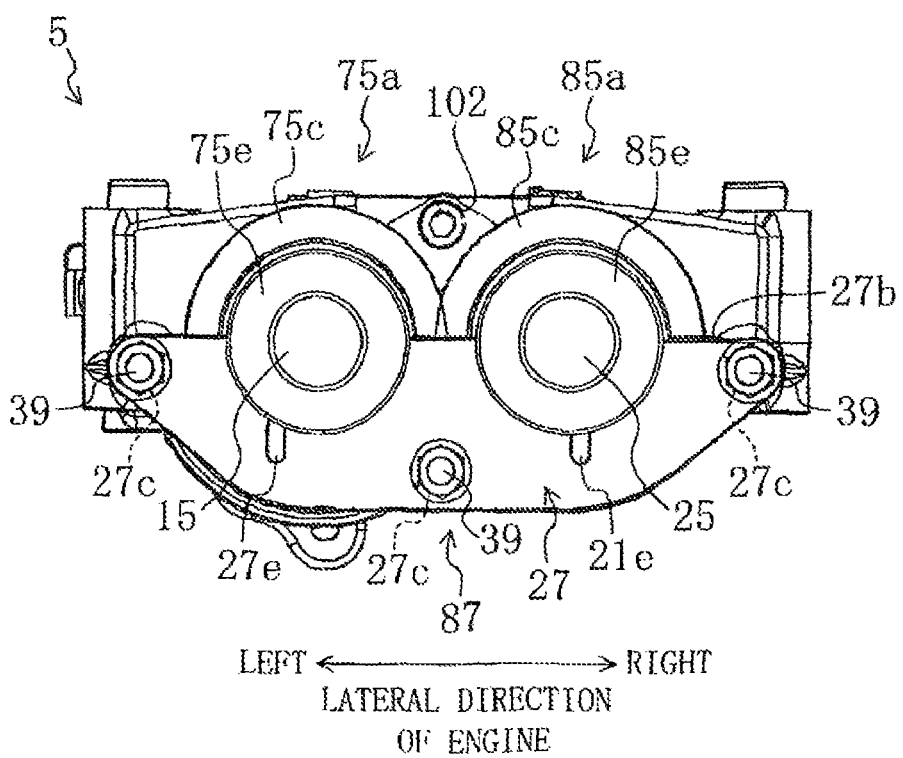
FIG. 5 is a rear view of the balancer.

To reduce entering of oil from outside the balancer housing 7, the thrust plate 27 is provided at the rear end of the gear housing 87 forming the open end 87c at the rear of the balancer housing 7, and covers a portion of the open end 87c under the line connecting the centers of the balancer shafts 15 and 25 (see, FIG. 5).

This thrust plate 27 is a pressed product made of a metal material exhibiting high abrasion resistance, and has a rounded inverted trapezoidal shape. Two approximately semicircular notches which are open at their tops are formed in a linear top 27b of the thrust plate 27. The thrust plate 27 has three through holes 27c, 27c, and 27c at positions corresponding to the three bolt insertion holes 87a, 87b, and 87b of the gear housing 87.

The thrust plate 27 is attached to the balancer housing 7 by screwing bolts 39, 39, and 39 inserted in the through holes 27c, 27c, and 27c into the bolt insertion holes 87a, 87b, and 87b of the gear housing 87, with the peripheries (hereinafter referred to as a pair of thrust control portions) 27a and 27a of a pair of notches formed in the thrust plate 27 fitted into the thrust control trenches 75f and 85f of the engaging gears 75a and 85a.

With the thrust plate 27 provided in the manner described above, even when the balancer shafts 15 and 25 are forced to shift in the fore and aft directions, the step 75h and 85h of the gear bodies 75c and 85c come into contact with the front surfaces of the thrust control portions 27a and 27a, and the front end surfaces of the annular flanges 75e and 85e come into contact with the rear surfaces of the thrust control portions 27a and 27a, thereby controlling a thrust shift caused by a thrust applied from both of the front and rear ends of the balancer shafts 15 and 25.

The thrust plate 27 further includes: two supply oil trenches 27d and 27d which are open at the front surface of the thrust plate 27; and two supply oil trenches 27e and 27e which are open at the rear surface of the thrust plate 27. These supply oil trenches (e.g., 27d, 27e) extend from the peripheries 27a and 27a of the notches to the positions corresponding to the bottoms of the gear bodies 75c and 85c. Oil accumulated in the gear housing 87 is smoothly supplied to space between the rear end surfaces of the gear bodies 75c and 85c and the front surface of the thrust plate 27 with the rotation of the engaging gears 75a and 85a. The front supply oil trench 27d and the rear supply oil trench 27e are symmetrical at the front and back sides of the thrust plate 27, i.e., oil supply paths can also be formed even when the thrust plate 27 is attached to the gear housing 87 with the front and back sides of the thrust plate 27 reversed.

—Attachment of Balancer Shaft to Balancer Housing—

Each of the balancer shafts 15 and 25 is inserted through the open end 87c at the rear of the balancer housing 7, and is placed in the balancer housing 7. Specifically, the driving balancer shaft 15 is inserted such that the shaft extension 15f of the driving balancer shaft 15 passes through a left portion of the gear housing 87, the left bearing hole 47a of the rear bearing wall 47, the left main-weight housing 67d, the left bearing hole 37a of the front bearing wall 37, the sub-weight housing 77e, and the bearing hole 57a of the distal bearing wall 57 in this order. The driven balancer shaft 25 is inserted such that the front journal 25a of the driven balancer shaft 25 passes through a right portion of the gear housing 87, the right bearing hole 47b of the rear bearing wall 47, the right main-weight housing 67e, and the right bearing hole 37b of the front bearing wall 37 in this order.

Prior to this insertion, in the driving balancer shaft 15, the inner race 51b of the needle rolling bearing 51 and a stopper ring 100c associated with the inner race 51b are press fitted with the distal journal 15a of the driving balancer shaft 15. The ring plates 100a and 100b and the inner races 31b and 41b of the needle rolling bearings 31 and 41 are press fitted with the front and rear journals 15b and 15c of the driving balancer shaft 15, and the holders 31d and 41d and the needle rollers 31c and 41c are attached to the front and rear journals 15b and 15c. Thereafter, the engaging gear 75a is press fitted with the rear end of the shaft.

In the same manner, in the driven balancer shaft 25, the inner race 61b of the needle rolling bearing 61 and a stopper ring 100d associated with the inner race 61b are press fitted with the front journal 25a of the driven balancer shaft 25. The ring plate 100a and the inner race 41b of the needle rolling bearing 41 are press fitted with the rear journal 25b of the driven balancer shaft 25. The holder 41d and the needle roller 41c are attached to the rear journal 25b. Thereafter, the engaging gear 85a is press fitted with the rear end of the shaft. In this manner, the pre-assembly unit illustrated in FIG. 15 is prepared.

On the other hand, in the balancer housing 7, in association with the driving balancer shaft 15, the outer race 51a is press fitted with the bearing hole 57a of the distal bearing wall 57 with the needle roller 51c and the holder 51d placed in the bearing hole 57a, and the spacer 91 is attached to this bearing hole 57a. The outer races 31a and 41a are press fitted with the left bearing holes 37a and 47a of the front and rear bearing walls 37 and 47.

Before or after this press fitting, stopper pins 101 for controlling the position of, and preventing slipping-out of, the outer races 31a and 41a are press fixed to the balancer housing 7 from outside the balancer housing 7 along the radial direction of the balancer housing 7 in such a manner that the thickness of the stopper pins 101 does not exceed the thicknesses of the outer races 31a and 41a. After these processes, stopper plates 102 for preventing slipping-out of both of the outer races 41a and 41a at the rear are bolted to the balancer housing 7 in such a manner that the thickness of the stopper plates 102 does not exceed the thicknesses of the outer races 31a and 41a.

In association with the driven balancer shaft 25, the outer race 61a is press fitted with the right bearing hole 37b of the front bearing wall 37 with the needle roller 61c and the holder 61d placed in the right bearing hole 37b, and the outer race 41a is press fitted with the right bearing hole 47b of the rear bearing wall 47.

In the same manner, before or after the press fitting, stopper pins 101 for controlling the position of, and preventing slipping-out of, the outer races 61a and 41a are press fixed to the balancer housing 7 from outside the balancer housing 7 along the radial direction of the balancer housing 7 in such a manner that the thickness of the stopper pins 101 does not exceed the thicknesses of the outer races 61a and 41a.

In this state, the driving and driven balancer shafts 15 and 25 are inserted into the balancer housing 7 with the engaging gears 75a and 85a engaged with each other. However, as described above, the outer diameter of rotational path of the main-weight part 15d of the driving balancer shaft 15 is smaller than the inner diameter of the outer race 41a fitted into the rear journal 15c. In addition, the outer diameter of rotational path of the sub-weight part 15e is smaller than the outer diameter of rotational path of the main-weight part 15d, and is approximately equal to the outer diameter of the distal and front journals 15a and 15b. This configuration can achieve smooth insertion of the driving balancer shaft 15.

Further, since the outer diameter of rotational path of the main-weight part 25c of the driven balancer shaft 25 is smaller than the inner diameter of the outer race 41a fitted into the rear journal 25b, smooth insertion of the driven balancer shaft 25 can be achieved.

Thereafter, the driving and driven balancer shafts 15 and 25 are placed in the balancer housing 7, and then the thrust plate 27 is attached to the thrust control trenches 75f and 85f of the engaging gears 75a and 85a with the thrust control portions 27a and 27a inserted in the thrust control trenches 75f and 85f from below, thereby covering the open end 87c of the balancer housing 7.

—Lubricating Oil Passageway—

As described above, in the driving and driven balancer shafts 15 and 25, the journals 15a, 15b, and 15c; 25a and 25b are respectively supported by the bearing holes 57a, 37a, and 47a; 37b and 47b with the needle rolling bearings 51, 31, and 41; 61 and 41 interposed therebetween. Accordingly, it is necessary to avoid a situation where the needle rolling bearings 51, 31, 41, 61, and 41 are immersed in oil. However, a necessary amount of oil needs to be supplied to the needle rolling bearings 51, 31, 41, 61, and 41.

Figure 18:
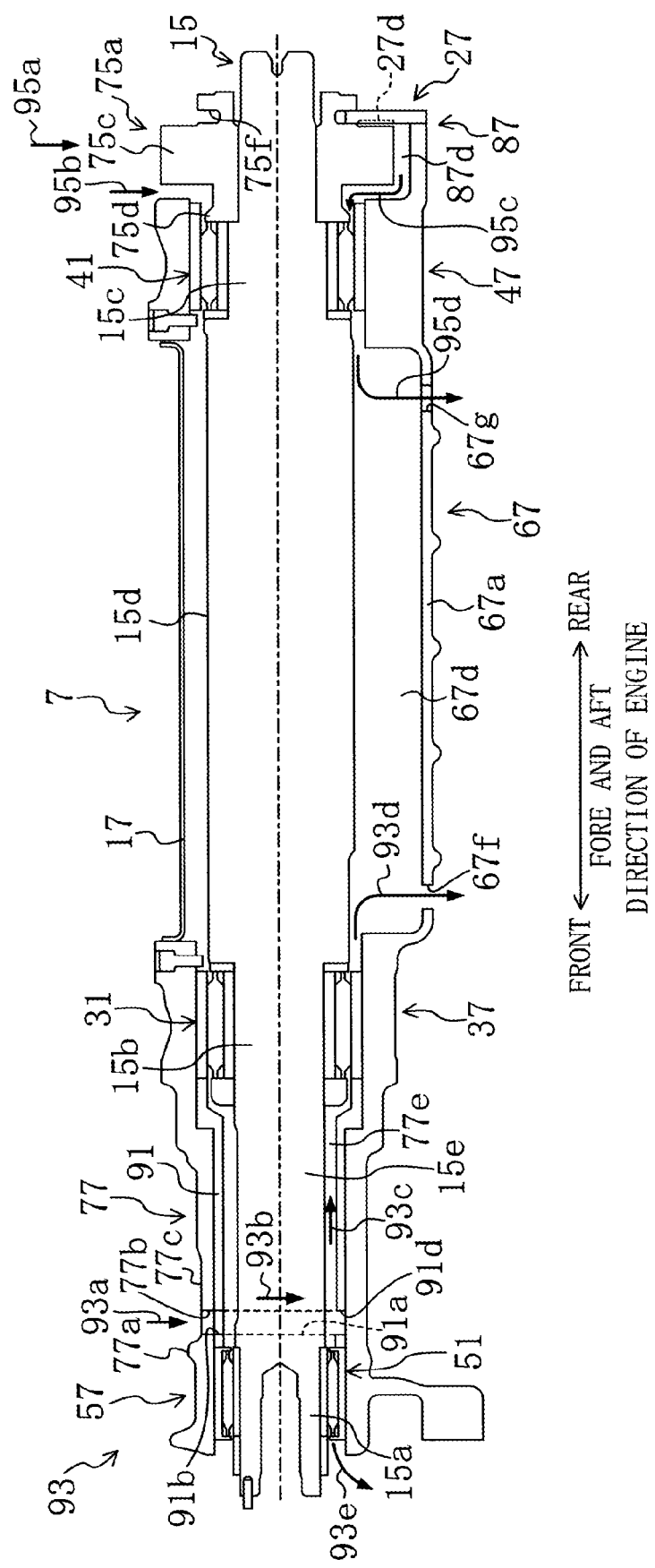
FIG. 18 is a view schematically illustrating lubricating oil passageways in the balancer housing.
Figure 19:
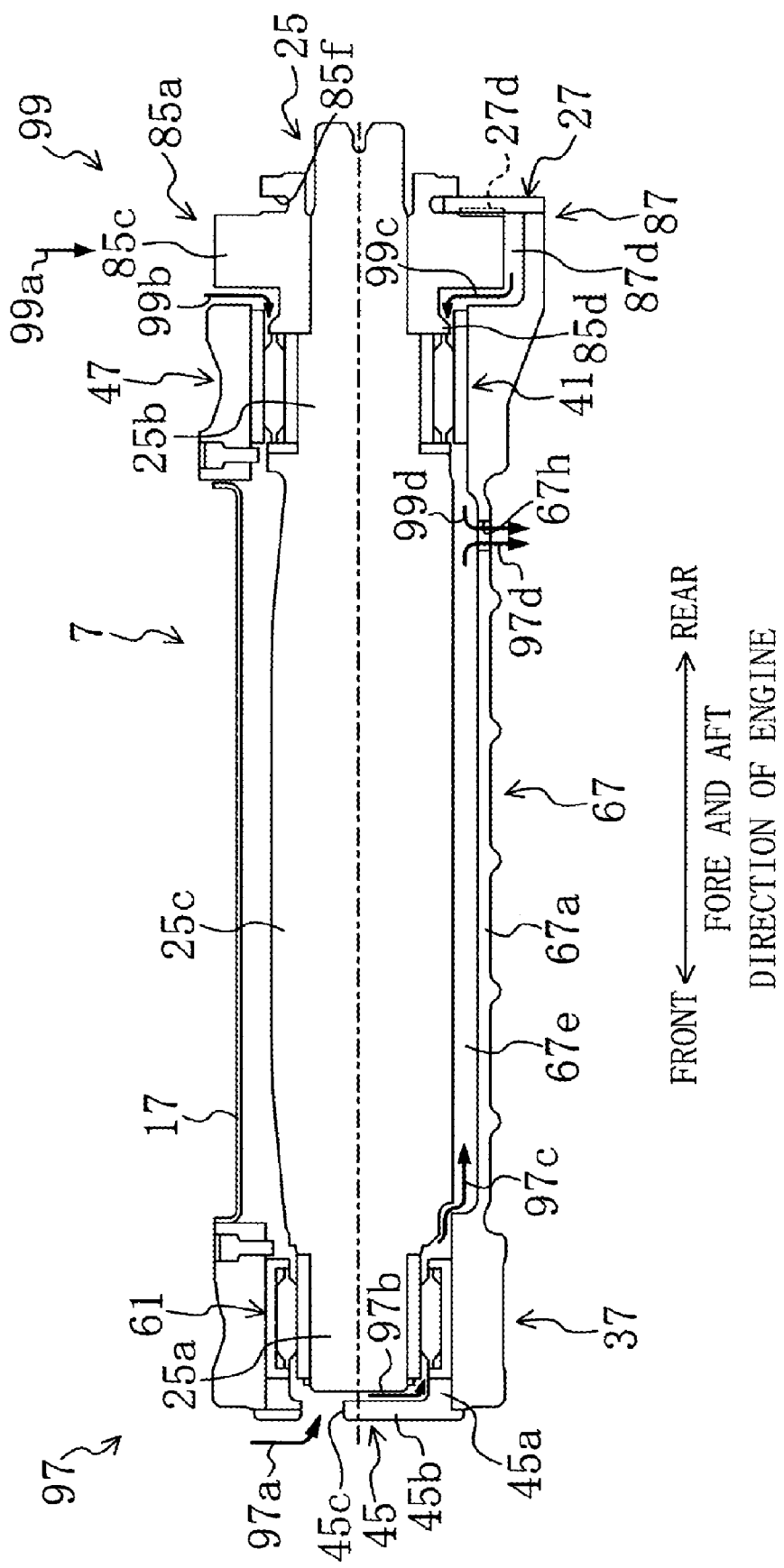
FIG. 19 s a view schematically illustrating lubricating oil passageways in the balancer housing.

In view of this, as illustrated in FIGS. 18 and 19, the balancer housing 7 includes: a first lubricating-oil passageway 93 for supplying oil to the distal and front journals 15a and 15b of the driving balancer shaft 15; a second lubricating oil passageway 95 for supplying oil to the rear journal 15c of the driving balancer shaft 15; a third lubricating-oil passageway 97 for supplying oil to the front journal 25a of the driven balancer shaft 25; and a fourth lubricating oil passageway 99 for supplying oil to the rear journal 25b of the driven balancer shaft 25. These lubricating oil passageways 93, 95, 97, and 99 are not used for force-feed lubrication to the journals 15a, 15b, 15c, 25a, and 25b, but are used for introducing part of oil which was supplied to the journals of the crankshaft 9 and dropped.

The first lubricating-oil passageway 93 includes: a path (indicated by the arrow 93a) passing through the lubrication hole 77b of the housing extension 77; a path (indicated by the arrow 93b) passing through, or around the periphery of, the spacer 91 to reach the bottom of the spacer 91; a path (indicated by the arrow 93c) passing through a gap between the sub-weight part 15e and the spacer 91 to reach the needle rolling bearing 31 (i.e., the front journal 15b); a path (indicated by the arrow 93d) for gravity drain of oil which has flown from the needle rolling bearing 31, to outside the balancer housing 7 through the drain oil opening 67f; and a path (indicated by the arrow 93e) for gravity drain of oil which has flown from the needle rolling bearing 51, to outside the balancer housing 7.

Part of oil which has dropped from a portion near the bearing wall 21e in front of the first cylinder 21a in the engine body 1 accumulates in the oil collection part 77c having an L shape in plan view and surrounded with the walls 77a of the housing extension 77, and enters the balancer housing 7 through the lubrication hole 77b. This part of oil passes through the supply through hole 91b of the spacer 91, flows down between the spacer 91 and the sub-weight part 15e, and flows in the fore and aft direction between the sub-weight potion 15e and the spacer 91.

In this example embodiment, even when a difference occurs between the lubrication hole 77b and the upper supply through hole 91b, in attaching the spacer 91 into the balancer housing 7, oil which has passed through the lubrication hole 77b also flows downward along the annular trench 91a formed in the outer surface of the spacer 91, into a gap between the spacer 91 and the sub-weight part 15e through, for example, the lower supply through hole 91d located below the upper supply through hole 91b of the spacer 91.

Oil which has flown rearward is supplied to the needle rolling bearing 31, and then is drained by gravity to outside the balancer housing 7 through the drain oil opening 67f. On the other hand, oil which has flown forward is supplied to the needle rolling bearing 51, and then is drained by gravity directly to outside the balancer housing 7 through the needle rolling bearing 51.

The second lubricating oil passageway 95 includes, as main components: a path (indicated by the arrow 95a) extending from above the gear body 75c of the engaging gear 75a directly to the gear housing 87; a path (indicated by the arrow 95b) passing through a gap between the front end surface of the gear body 75c of the engaging gear 75a and the rear end surface of the top of the rear bearing wall 47; a path (indicated by the arrow 95c) passing through a gap between the front end surface of the gear body 75c of the engaging gear 75a and the rear end surface of the bottom of the rear bearing wall 47; and a path (indicated by the arrow 95d) for gravity drain of oil to outside the balancer housing 7 through the drain oil opening 67g.

Specifically, part of oil which has dropped from a portion near the bearing wall 21g between the third cylinder 21c and the fourth cylinder 21d in the engine body 1 enters the gear housing 87 from above the gear body 75c and through a gap between the front end surface of the gear body 75c and the rear end surface of the top of the rear bearing wall 47. This part of oil reaches the needle rolling bearing 41 (i.e., the rear journal 15c), while being agitated by the rotation of the engaging gear 75a in the gear housing 87. At this time, the annular projection 75d of the engaging gear 75a controls an excess supply of oil to the needle rolling bearing 41 as described above.

In this manner, oil which has entered from above the gear body 75c and flown through a gap between the front end surface of the gear body 75c and the rear end surface of the bottom of the rear bearing wall 47 is supplied to the needle rolling bearing 41, while being controlled in its supply by the annular projection 75d of the engaging gear 75a. In this manner, oil supplied to the needle rolling bearing 41 is drained by gravity to outside the balancer housing 7 through the drain oil opening 67g, while lubricating the needle rolling bearing 41.

The third lubricating-oil passageway 97 includes: a path (indicated by the arrow 97a) passing through an opening of the cap 45 provided at the right front end surface of the front bearing wall 37; a path (indicated by the arrow 97b) passing through a gap between the distal surface of the driven balancer shaft 25 and the cap 45 to reach the needle rolling bearing 61 (i.e., the front journal 25a); a path (indicated by the arrow 97c) passing through a gap between the main-weight part 25c and the bottom wall 67a of the housing body 67 from the needle rolling bearing 61; and a path (indicated by the arrow 97d) for gravity drain of oil to outside the balancer housing 7 through the drain oil opening 67h.

Figure 20A:
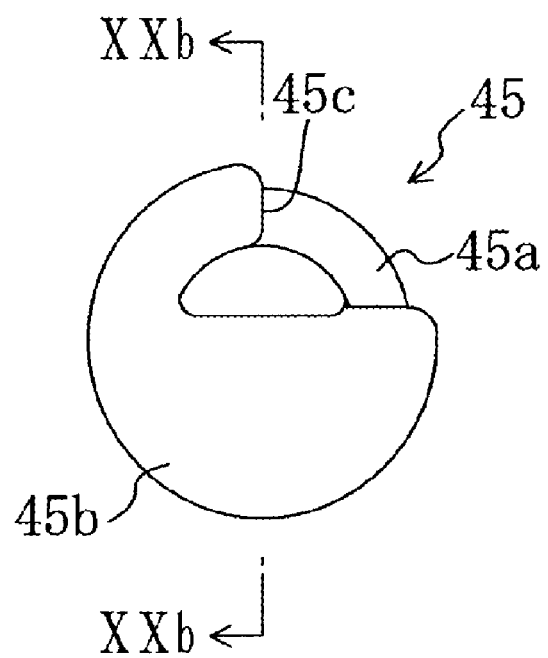
FIGS. 20A and 20B are views illustrating a structure of a cap.
Figure 20B:
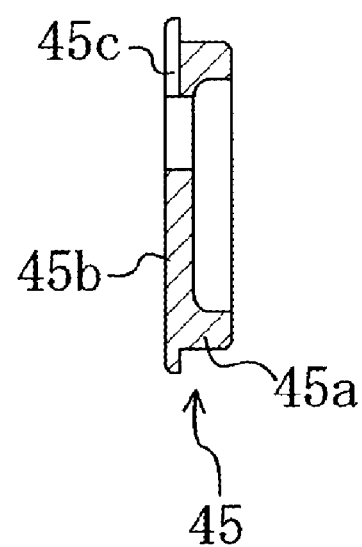

As illustrated in FIG. 20, the cap 45 includes: an annular portion 45a fitted with the right bearing hole 37b of the front bearing wall 37; and a disk part 45b covering the front end of the annular part 45a and having a flange projecting radially outwardly. The disk part 45b is open in an approximately upper half of a portion thereof associated with the inner space of the annular part 45a, and a recessed cut-out portion 45c with a shape obtained by cutting out a flange from an approximately left half of a portion thereof associated with the annular part 45a. With this configuration, the recessed cut-out portion 45c is flush with the front surface of the front bearing wall 37 of the balancer housing 7, as illustrated in FIGS. 17 and 19. This recessed cut-out portion 45c forms an oil guide part which is formed in an upper portion of the cap 45 to allow the inside of the balancer housing 7 to communicate with the outside and is used for guiding oil which has dropped from the engine body 1 to the inside of the balancer housing 7.

In this manner, part of oil which has dropped from a portion near the bearing wall 21f between the first cylinder 21a and the second cylinder 21b in the engine body 1 flows down along the front surface of the front bearing wall 37, enters the balancer housing 7 through the recessed cut-out portion 45c of the disk part 45b, and is supplied to the needle rolling bearing 61 through a gap between the distal surface of the driven balancer shaft 25 and the rear side surface of the disk part 45b.

Oil supplied to the needle rolling bearing 61 flows rearward in the right main-weight housing 67e, and is drained by gravity to outside the balancer housing 7 through the drain oil opening 67h.

The fourth lubricating oil passageway 99 includes, as main components: a path (indicated by the arrow 99a) extending from above the gear body 85c of the engaging gear 85a directly to the gear housing 87; a path (indicated by the arrow 99b) passing through a gap between the front end surface of the gear body 85c of the engaging gear 85a and the rear end surface of the top of the rear bearing wall 47; a path (indicated by the arrow 99c) passing through a gap between the front end surface of the gear body 85c of the engaging gear 85a and the rear end surface of the bottom of the rear bearing wall 47; and a path (indicated by the arrow 99d) for gravity drain of oil to outside the balancer housing 7 through the drain oil opening 67h. Oil is supplied and drained through this fourth lubricating oil passageway 99 in the same manner as in the second lubricating oil passageway 95.

As described above, in the balancer 5 of this example embodiment, first, the aperture 67o of the housing body 67 extends across the two adjacent cylinders 21b and 21c, and thus the main-weight parts 15d and 25c are long in the fore and aft direction. With this configuration, vibration due to rotational imbalance in the crankshaft 9 can be canceled without the necessity for increasing the lengths of the main-weight parts 15d and 25c in the radial direction, thereby reducing the size of the balancer housing 7.

In addition, in the balancer 5, the outer diameter of rotational path of the main-weight parts 15d and 25c is smaller than the inner diameter of the outer races 41a and 41a of the needle rolling bearings 41 and 41 of the rear bearing wall 47, but is larger than the outer diameter of the inner races 31b and 61b of the needle rolling bearings 31 and 61 of the front bearing wall 37. With this configuration, as long as the inner diameter of the left and right bearing holes 47a and 47b (including the outer races 41a and 41a) of the rear bearing wall 47 is set large enough to allow at least the main-weight parts 15d and 25c to pass therethtough, even when the balancer shafts 15 and 25 are inserted into the balancer housing 7 with the inner races 31b and 61b press fitted with the driving and driven balancer shafts 15 and 25 and the outer races 41a and 41a press fitted with the balancer housing 7, smooth insertion of the balancer shafts 15 and 25 can be achieved. Consequently, reducing the outer diameter of rotational path of the main-weight parts 15d and 25c can achieve compact size of the balancer housing 7 accordingly.

Furthermore, in the balancer 5, as illustrated in FIGS. 16 and 17, the outer diameter of rotational path of the main-weight parts 15d and 25c is slightly smaller than the inner diameter of the outer races 41a and 41a fitted into the rear journals 15c and 25b. In this manner, the outer diameter of the needle rolling bearings 41 and 41 which tends to be larger than the outer diameter of the metal bearings because of the structure, is reduced to a value slightly larger than the outer diameter of rotational path of the main-weight parts 15d and 25c, thereby achieving compact size of the needle rolling bearings 41 and 41.

Moreover, the balancer shafts 15 and 25 are inserted through the open end 87c of the balancer housing 7, thereby eliminating the necessity for vertically splitting the balancer housing 7, unlike conventional balancers. Accordingly, the distance in the lateral direction between the balancer shafts 15 and 25 can be reduced. As a result, the engaging gears 75a and 85a provided in the balancer shafts 15 and 25 can be made small, thereby achieving compact size of the balancer housing 7 for housing these gears.

In the balancer 5, the engaging gears 75a and 85a are located at positions closer to the rear than the rear bearing wall 47, i.e., portions having the maximum outer diameter in the balancer shafts 15 and 25 are located at the end opposite the end through which the balancer shafts 15 and 25 are inserted. Accordingly, it is unnecessary to considerably increase the size of the bearing holes 37a, 37b, 47a, and 47b of the front and rear bearing walls 37 and 47 in order to insert the balancer shafts 15 and 25, thereby achieving compact size of the balancer housing 7.

Further, the thrust control portions 27a and 27a of the thrust plate 27 are inserted in the thrust control trenches 75f and 85f of the engaging gears 75a and 85a provided at the ends of the balancer shafts 15 and 25, thereby controlling a thrust shift caused by a thrust applied from both of the front and rear ends of the balancer shafts 15 and 25. Consequently, as compared to a configuration in which the thrust plate 27 is formed in, for example, the housing body 67, the structure can be simplified, and as a result, the balancer housing 7 can be made compact.

The aperture 67o of the housing body 67 is covered with the plate-shaped housing cover 17 thinner than a member forming this housing body 67. Accordingly, the height of the housing body 67 can be reduced, and the shaft axes of the balancer shafts can be located at a higher level, as compared to the balancer housing having a thick upper wall.

The foregoing configuration allows the balancer 5 of this example embodiment to be made compact in the vertical direction. Even when oil is poured in the oil pan 3 to the full level, the balancer 5 is only partially immersed in the oil (see, the oil level surface L in FIG. 4).

As described above, in the balancer 5 of this example embodiment, the height of the balancer housing 7 is reduced so that the shaft axes of the balancer shafts are located at a higher level, thereby allowing the needle rolling bearings (e.g., 31, 41, 41) to be less likely to be immersed in oil. In this manner, an excess supply of oil to the needle rolling bearings (e.g., 31, 41, 41) can be reduced, thereby ensuring smooth rotation of the needle rolling bearings (e.g., 31, 41, 41). Consequently, friction between the balancer shafts 15 and 25 and the bearing holes (e.g., 37a, 37b, 47a) can be reduced, thereby reducing fuel consumption.

In the above example embodiment, the pair of balancer shafts 15 and 25 is supported by the bearing holes 37a, 37b, 47a, and 47b with the needle rolling bearings 31, 41, and 61 interposed therebetween. Accordingly, as compared to the case of employing metal bearings, friction between the balancer shafts 15 and 25 and the bearings can be reduced, thereby reducing fuel consumption.

In addition, the aperture 67o of the housing body 67 is covered with the housing cover 17, thereby reducing an unintentional supply of oil which has dropped from, for example, the crankshaft 9 to the needle rolling bearings 31, 41, and 61.

Further, the outer diameter of rotational path of the main-weight parts 15d and 25c is smaller than the inner diameter of the outer races 41a and 41a of the needle rolling bearings 41 and 41 of the rear bearing wall 47, and is larger than the outer diameter of the inner races 31b and 61b of the needle rolling bearings 31 and 61 of the front bearing wall 37. Accordingly, the balancer shafts 15 and 25 can be easily inserted through the end 87c at the rear of the balancer housing 7.

Furthermore, the housing cover 17 extends along the outer periphery of rotational path of the main-weight parts 15d and 25c in cross section. Accordingly, it is possible to locate the housing cover 17 to partially enter the housing so that the shaft axes of the balancer shafts on the balancer housing 7 can be located at a higher level.

The gaps 29 and 29 are provided between the housing cover 17 and the housing body 67 in the vertical direction, thereby causing oil swept by the mass portions 15g and 25e to pass through these gaps 29 and 29. The housing cover 17 extends laterally outwardly beyond both sides in the lateral direction of the aperture 67o. Thus, oil which has passed through the gaps 29 and 29 can be guided by the housing cover 17 and easily drained to outside the housing body 67.

The housing cover 17 is located below the tops of the mounting eyes (e.g., 37c and 37d) in the vertical direction. Accordingly, even when the mounting eyes (e.g., 37c and 37d) have a small projection length, a sufficient distance in the vertical direction can be easily ensured between the housing cover 17 and the connecting rod.

The present invention is not limited to the above example embodiment, and can be implemented in various forms without departing from the spirit or main features thereof.

The above example embodiment employs the aluminum die cast balancer housing 7 which is casted as one piece. Alternatively, a balancer housing having split surfaces which are split in the fore and aft direction may be employed, for example.

Further, in the above example embodiment, the cylindrical inner races 31b, 41b, 51b, and 61b and the ring plates 100a and 100b are used for the needle rolling bearings 31, 41, 51, and 61. Alternatively, these ring plates may be omitted, and inner races having U shapes in cross section may be used instead. If the materials for the balancer shafts 15 and 25 are compatible with the needle rollers 31c, 41c, 51c, and 61c, the inner races 31b, 41b, 51b, and 61b may be omitted.

In the example embodiment, only the lubricating oil passageways 93, 95, 97, and 99 for introducing part of oil which was supplied to the bearing of the crankshaft 9 and dropped are formed in the balancer housing 7. Alternatively, as long as an excessive oil supply to the needle rolling bearings (e.g., 31, 41, 41) is reduced, the above passageways may be replaced with lubricating oil passageways for force-feed lubrication to the journals 15a, 15b, 15c, 25a, and 25b.

Further, in the example embodiment, the weight parts 15d, 15e, and 25c have semicircular shapes when viewed from the front side of the engine, but may be in any shape as long as vibration due to rotational imbalance of the crankshaft 9 is canceled.

Moreover, in the example embodiment, the driving and driven balancer shafts 15 and 25 are inserted through the open end 87c at the rear of the balancer housing 7, but may be inserted through an open end located at the front side of the balancer housing 7.

Furthermore, the example embodiment employs the engaging gears 75a and 85a including the gear bodies 75c and 85c made of helical gears. Alternatively, an engaging gear including a gear body made of a worm gear may be employed, for example.

In the example embodiment, the thrust control trenches 75f and 85f are formed in the engaging gears 75a and 85a. Alternatively, the thrust control trenches may be directly formed in the balancer shafts 15 and 25.

In the example embodiment, the front and rear bearing walls 37 and 47 are attached to the bearing walls 21f and 21g such that the aperture 67o of the balancer housing 7 extends across the two adjacent cylinders 21c and 21d. Alternatively, the front and rear bearing walls 37 and 47 may be attached to bearing walls sandwiching one cylinder or three or more cylinders.

The rolling bearings are not limited to the needle rolling bearings 31, 41, 51, and 61 (i.e., needle bearings), but may be cylindrical rolling bearings and ball bearings.

The gear housing 87 only needs to house an approximately lower half of each of the engaging gears 75a and 85a, but may house approximately the whole of each of the engaging gears 75a and 85a.

In this manner, the example embodiment is merely an example in all respects, and should not be construed or interpreted to be restrictive. All equivalents, changes, and modifications that come within the spirit of the inventions as defined by the following claims are desired to be protected.

As described above, the present invention is useful for, for example, balancers in which balancer shafts are rotatably supported by balancer housings with rolling bearings interposed therebetween.

What is claimed is:

1. An engine balancer provided in an oil pan located at a bottom of an engine, the engine balancer comprising:
   a pair of balancer shafts extending in a fore and aft direction of the engine and disposed side by side in a lateral direction of the engine, the fore and aft direction of the engine being parallel to a crankshaft, the lateral direction of the engine being orthogonal to the fore and aft direction and to a vertical direction of the engine;
   a plate-shape cover member; and
   a balancer housing for housing the pair of balancer shafts, wherein the balancer housing includes:
      a pair of front and rear bearing walls disposed in the fore and aft direction of the engine,
      a pair of left and right bearing holes respectively penetrating the pair of front and rear bearing walls and supporting the pair of balancer shafts with rolling bearings interposed therebetween, and
      a housing body located between the pair of front and rear bearing walls, the bearing walls of the balancer housing are attached to bearing walls for supporting the crankshaft provided in the engine,
      the housing body has an aperture at a top thereof, the aperture extends in the fore and aft direction and is disposed between the front and the rear bearing walls,
      the plate-shaped cover member, which is disposed between the front and the rear bearing walls, substantially covers the aperture, and the plate-shaped cover member is separate from and uniformly thinner than a member forming the housing body.

2. The engine balancer of claim 1, wherein the pair of balancer shafts includes balancer weight parts provided between the pair of front and rear bearing walls and engaging gears engaged with each other, and is inserted through an opening formed at a first side, in the fore and aft direction of the engine, of the balancer housing to be placed in the balancer housing, and
   an outer diameter of rotational path of each of the balancer weight parts is smaller than an inner diameter of an outer race of the rolling bearing of one of the pair of front and rear bearing walls located at the first side in the fore and aft direction of the engine, and is larger than an outer diameter of an inner race of the rolling bearing of the other bearing wall.

3. The engine balancer of claim 2, wherein the cover member extends along an outer periphery of rotational path of each of the balancer weight parts in cross section.

4. The engine balancer of claim 2, wherein the engaging gears are closer to the first side in the fore and aft direction of the engine, than one of the pair of front and rear bearing walls located at the first side in the fore and aft direction of the engine.

5. The engine balancer of claim 1, wherein the cover member extends laterally outwardly beyond both ends, in the lateral direction of the engine, of the aperture, and is adjacent to the housing body with a gap interposed therebetween in the vertical direction of the engine.

6. The engine balancer of claim 1, wherein mounting eyes project from tops of the pair of bearing walls of the balancer housing,
   the pair of bearing walls of the balancer housing is attached to the bearing walls for supporting the crankshaft with the mounting eyes interposed therebetween, and
   the cover member is located below tops of the mounting eyes in the vertical direction of the engine.

7. The engine balancer of claim 1, wherein the pair of bearing walls of the balancer housing is attached to the bearing walls for supporting the crankshaft sandwiching two adjacent cylinders in the fore and aft direction of the engine.

8. The engine balancer of claim 2, wherein the cover member extends laterally outwardly beyond both ends, in the lateral direction of the engine, of the aperture, and is adjacent to the housing body with a gap interposed therebetween in the vertical direction of the engine.

9. The engine balancer of claim 2, wherein mounting eyes project from tops of the pair of bearing walls of the balancer housing,
   the pair of bearing walls of the balancer housing is attached to the bearing walls for supporting the crankshaft with the mounting eyes interposed therebetween, and
   the cover member is located below tops of the mounting eyes in the vertical direction of the engine.

10. The engine balancer of claim 2, wherein the pair of bearing walls of the balancer housing is attached to the bearing walls for supporting the crankshaft sandwiching two adjacent cylinders in the fore and aft direction of the engine.

11. The engine balancer of claim 3, wherein the engaging gears are closer to the first side in the fore and aft direction of the engine, than one of the pair of front and rear bearing walls located at the first side in the fore and aft direction of the engine.

12. The engine balancer of claim 3, wherein the cover member extends laterally outwardly beyond both ends, in the lateral direction of the engine, of the aperture, and is adjacent to the housing body with a gap interposed therebetween in the vertical direction of the engine.

13. The engine balancer of claim 3, wherein mounting eyes project from tops of the pair of bearing walls of the balancer housing,
   the pair of bearing walls of the balancer housing is attached to the bearing walls for supporting the crankshaft with the mounting eyes interposed therebetween, and
   the cover member is located below tops of the mounting eyes in the vertical direction of the engine.

14. The engine balancer of claim 3, wherein the pair of bearing walls of the balancer housing is attached to the bearing walls for supporting the crankshaft sandwiching two adjacent cylinders in the fore and aft direction of the engine.

15. The engine balancer of claim 4, wherein the cover member extends laterally outwardly beyond both ends, in the lateral direction of the engine, of the aperture, and is adjacent to the housing body with a gap interposed therebetween in the vertical direction of the engine.

16. The engine balancer of claim 4, wherein mounting eyes project from tops of the pair of bearing walls of the balancer housing,
   the pair of bearing walls of the balancer housing is attached to the bearing walls for supporting the crankshaft with the mounting eyes interposed therebetween, and
   the cover member is located below tops of the mounting eyes in the vertical direction of the engine.

17. The engine balancer of claim 4, wherein the pair of bearing walls of the balancer housing is attached to the bearing walls for supporting the crankshaft sandwiching two adjacent cylinders in the fore and aft direction of the engine.

18. The engine balancer of claim 11, wherein the cover member extends laterally outwardly beyond both ends, in the lateral direction of the engine, of the aperture, and is adjacent to the housing body with a gap interposed therebetween in the vertical direction of the engine.

19. The engine balancer of claim 11, wherein mounting eyes project from tops of the pair of bearing walls of the balancer housing,
    the pair of bearing walls of the balancer housing is attached to the bearing walls for supporting the crankshaft with the mounting eyes interposed therebetween, and
    the cover member is located below tops of the mounting eyes in the vertical direction of the engine.

20. The engine balancer of claim of claim 11, wherein the pair of bearing walls of the balancer housing is attached to the bearing walls for supporting the crankshaft sandwiching two adjacent cylinders in the fore and aft direction of the engine.

* * * * *